(12) United States Patent
Waddell et al.

(10) Patent No.: US 7,960,454 B2
(45) Date of Patent: Jun. 14, 2011

(54) PROCESSING AIDS FOR ELASTOMERIC COMPOSITIONS

(75) Inventors: Walter Harvey Waddell, Pasadena, TX (US); David Yen-Lung Chung, Bellaire, TX (US); Robert Christopher Napier, Baytown, TX (US); Donald Sheley Tracey, Kingwood, TX (US); Dirk Frans Rouckhout, Grotesteenweg (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 429 days.

(21) Appl. No.: 12/093,786

(22) PCT Filed: Dec. 16, 2005

(86) PCT No.: PCT/US2005/045978
§ 371 (c)(1),
(2), (4) Date: May 15, 2008

(87) PCT Pub. No.: WO2007/070063
PCT Pub. Date: Jun. 21, 2007

(65) Prior Publication Data
US 2008/0281021 A1    Nov. 13, 2008

(51) Int. Cl.
| | | |
|---|---|---|
| D06M 15/11 | (2006.01) | |
| E01C 7/26 | (2006.01) | |
| C08K 3/26 | (2006.01) | |
| C08K 3/34 | (2006.01) | |
| C04B 28/26 | (2006.01) | |
| C04B 26/06 | (2006.01) | |
| C08J 3/22 | (2006.01) | |
| C08L 37/00 | (2006.01) | |
| C08L 35/02 | (2006.01) | |
| C08L 27/00 | (2006.01) | |
| C08L 27/04 | (2006.01) | |

(52) U.S. Cl. .......... 524/53; 524/426; 524/449; 524/445; 524/442; 524/451; 524/68; 524/437; 524/517; 525/225; 525/209; 525/214

(58) Field of Classification Search ............... 524/53, 524/426, 449, 445, 442, 451, 68, 437, 517; 525/225, 209, 214
See application file for complete search history.

(56) References Cited

U.S. PATENT DOCUMENTS

| | | | |
|---|---|---|---|
| 5,162,409 A | 11/1992 | Mroczkowski | |
| 5,386,864 A | 2/1995 | Costemalle et al. | |
| 5,491,196 A | 2/1996 | Beers et al. | |
| 5,631,316 A | 5/1997 | Costemalle et al. | |
| 5,922,153 A | 7/1999 | Beers et al. | |
| 6,293,327 B1 | 9/2001 | Minagawa et al. | |
| 6,710,116 B1 | 3/2004 | Waddell et al. | |
| 2002/0151636 A1 | 10/2002 | Wada et al. | |
| 2005/0027062 A1 | 2/2005 | Waddell et al. | |
| 2005/0187355 A1 * | 8/2005 | Tasaka et al. | 525/314 |

FOREIGN PATENT DOCUMENTS

| | | |
|---|---|---|
| EP | 0 102 844 | 3/1984 |
| EP | 0 127 998 | 12/1984 |
| EP | 0 644 208 | 3/1995 |
| JP | 11035735 | 2/1999 |
| JP | 2003/170438 | 6/2003 |
| JP | 2003/192854 | 7/2003 |
| JP | 2003/292705 | 10/2003 |
| JP | 2005/036043 | 2/2005 |
| WO | WO 9705196 | 2/1997 |
| WO | WO 02/32992 | 4/2002 |
| WO | WO 02/32993 | 4/2002 |
| WO | WO 02/32995 | 4/2002 |
| WO | WO 02/48257 | 6/2002 |
| WO | WO 2004/009700 | 1/2004 |
| WO | WO 2004/044052 | 5/2004 |
| WO | WO 2004/058874 | 7/2004 |

* cited by examiner

*Primary Examiner* — William K Cheung

(57) ABSTRACT

The invention provides for processes to produce elastomeric compositions, the processes including contacting at least one elastomer with a processing aid, wherein the processing aid comprises at least one functionalized polymer having at least one anhydride group. The invention also provides for articles such as innerliners for tires produced from the aforementioned elastomeric compositions.

19 Claims, No Drawings

PROCESSING AIDS FOR ELASTOMERIC COMPOSITIONS

The present application claims the benefit of PCT Application No. PCT/US2005/045,978 filed on 16 Dec. 2005, the disclosure of which is incorporated by reference.

FIELD OF THE INVENTION

The invention relates to processing aids for use in the production of elastomeric compositions. In particular, the invention relates to processing aids including functionalized polymers for use in the production of elastomeric compositions.

BACKGROUND

In the tire industry, manufacturers of tires and tire components have endless choices when fabricating such items. For example, the selection of ingredients for the commercial formulations of tires and tire components depends upon the balance of properties desired and the end use such as bias or radial, and its intended end use (e.g., aircraft, truck/bus, or automobile).

An equally important consideration in the selection of ingredients can be the ability to efficiently process the individual components into batch rubber mixes, and then the further downstream processing of those uncured rubber mixes. For example dry solids, particularly dust-free particles like fillers, may be easily air-conveyed and automatically weighed into the required amounts for batch production in internal mixers such as Banbury™ mixers. Bulk solids such as baled polymers, may require cutting into smaller more manageable sizes so that required amounts for batch production are exactly added. Liquids have the same problems of conveying, weighing, but also may have the added concerns due to their volatility and ability to flow without spillage. For example, a viscous liquid may require heating in order to promote required flow rates for accurate weighing and adding to the batch internal mixer without the generation of volatile gas emissions.

Moreover, the further downstream processing of these uncured rubber mixes may be highly dependent upon the specific factory equipment used. Thus, properties of the uncured rubber mixes such as Mooney viscosity and Mooney scorch values can be important variables and parameters to manage in helping to optimize manufacturing efficiency, particularly since rubber processing equipment subsequent to mixing such as roll mills, roller dies, calendars, extruders, and the like can differ significantly in production volumes and rates and in operating temperatures throughout factories throughout the world. Thus, a requirement for an ingredient for these mixes is its ability to contribute to the ease of processing of the uncured rubber mixes. In particular, when fabricating that portion of the tire relied upon for air impermeability, such as the tire innerliner, manufacturers have applied a myriad of approaches including the widespread use of "butyl" rubbers or elastomers in various embodiments.

Butyl rubbers, generally, copolymers of isobutylene and isoprene, optionally halogenated, have widespread application due to their ability to impart desirable air impermeability properties for the tire. Halobutyl rubbers (halogenated butyl rubber) are the polymers of choice for air-retention in tire innerliners for passenger, truck/bus, and aircraft applications. See, for example, U.S. Pat. No. 5,922,153, U.S. Pat. No. 5,491,196, EP 0 102 844 and EP 0 127 998. Bromobutyl rubber, chlorobutyl rubbers, and branched ("star-branched") halogenated butyl rubbers are isobutylene-based elastomers that can be formulated for these specific applications. EXXPRO™ elastomers (ExxonMobil Chemical Company, Houston, Tex.), generally, halogenated random copolymers of isobutylene and para-methylstyrene, have also been of particular interest due to their improvements over traditional butyl rubbers. See, for example, U.S. Pat. No. 6,293,327, U.S. Pat. No. 5,386,864, U.S. Patent Application Publication No. 2002/151636, JP 2003170438, and JP 2003192854 (applying various approaches of blends of commercial EXXPRO™ elastomers with other polymers).

Of the myriad of choices an artisan has in processing the aforementioned elastomeric compositions, selection of the processing aid is of growing importance. Processing aids are an important consideration when processing elastomers for tire innerliners because they can affect the permeability of the cured tire, the ability of the components of the shaped but uncured tire to adhere to one another called "green tack," and/or the downstream processing efficiency of the uncured rubber mixes. By selecting the appropriate processing aid, a manufacturer can effect the conditions by which the elastomers are processed and many of the properties of the end use articles produced by those elastomers. For example, a lower Mooney viscosity uncured rubber mix may allow for an increase in production rates. However, too low of a Mooney viscosity may result in the stretching or tearing of the uncured rubber mix potentially increasing scrap rates. Similarly, an increase in the Mooney scorch of the uncured rubber mix may allow the use of higher operating temperatures of mills, dies, calendars, extruders, and the like.

In the past, industry generally accepted distillate "cuts" from the refining process or processing oils such as aromatic, paraffinic, naphthenic oils, and mixtures thereof to assist in the processing of elastomeric compositions. See, for example, U.S. Pat. No. 5,162,409 and U.S. Pat. No. 5,631,316. However, use of these ingredients may result in increasing the permeability of the air membrane such as the innerliner. More recently, polybutene processing aids have been of great interest because of their ability to reduce the permeability of the air membrane component while maintaining the other desirable properties of an in-service tire and/or in tire manufacturing. See, for example, U.S. Pat. No. 6,710,116, U.S. Patent Application Publication No. 2005/0027062, WO 2002/32995, WO 2002/32992, WO 2002/32993, WO 2002/48257, and WO 2004/009700. The use of polybutene processing aids represents a radical departure from past endeavors because these processing aids are produced through polymerization processes not distillate "cuts" from the refining process.

Other background references include WO 2004/058874 and JP 2003292705.

However, even more improvements are needed to provide more options and flexibility to the balance of properties that manufacturers must consider when making decisions on how elastomers should be processed in light of the desired properties of the specific end use articles. For example, it is still desirable to further reduce the permeability of the air membrane component of a tire or to maintain the permeability of the air membrane component and/or reduce the processing restrictions of the uncured rubber mixes. The present invention fulfills this need by providing more options in this regard through the use of processing aids including functionalized polymers described herein.

SUMMARY OF THE INVENTION

The invention provides for processes to produce elastomeric compositions, the processes comprising contacting at least one elastomer with a processing aid, wherein the processing aid comprises at least one functionalized polymer having at least one anhydride group.

In another embodiment, the invention also provides for articles such as innerliners for tires produced from the aforementioned elastomeric compositions.

DETAILED DESCRIPTION OF THE INVENTION

Various specific embodiments, versions and examples of the invention will now be described, including preferred embodiments and definitions that are adopted herein for purposes of understanding the claimed invention.

In reference to Periodic Table "Groups", the new numbering scheme for the Periodic Table Groups is used as found in HAWLEY'S CONDENSED CHEMICAL DICTIONARY, p 852 (13th ed. 1997).

Slurry refers to a volume of diluent comprising polymers that have precipitated from the diluent, monomers, Lewis acid, and initiator. The slurry concentration is the volume percent of the partially or completely precipitated polymers based on the total volume of the slurry.

Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form the monomer. However, for ease of reference the phrase comprising the (respective) monomer or the like is used as shorthand. Likewise, when catalyst components are described as comprising neutral stable forms of the components, it is well understood by one skilled in the art, that the ionic form of the component is the form that reacts with the monomers to produce polymers.

Rubber refers to any polymer or composition of polymers consistent with the ASTM D1566 definition: "a material that is capable of recovering from large deformations, and can be, or already is, modified to a state in which it is essentially insoluble (but can swell) in boiling solvent.". Elastomer is a term that may be used interchangeably with the term rubber.

Elastomeric composition refers to any composition comprising at least one elastomer as defined above.

A vulcanized rubber compound by ASTM D1566 definition refers to "a crosslinked elastic material compounded from an elastomer, susceptible to large deformations by a small force capable of rapid, forceful recovery to approximately its original dimensions and shape upon removal of the deforming force". A cured elastomeric composition refers to any elastomeric composition that has undergone a curing process and/or comprises or is produced using an effective amount of a curative or cure package, and is a term used interchangeably with the term vulcanized rubber compound.

A thermoplastic elastomer by ASTM D1566 definition refers to a rubber-like material "that repeatedly can be softened by heating and hardened by cooling through a temperature range characteristic of the polymer, and in the softened state can be shaped into articles". Thermoplastic elastomers are microphase separated systems of at least two polymers. One phase is the hard polymer that does not flow at room temperature, but becomes fluid when heated, that gives thermoplastic elastomers its strength. The other phase is a soft rubbery polymer that gives thermoplastic elastomers their elasticity. The hard phase is typically the major or continuous phase.

A thermoplastic vulcanizate by ASTM D1566 definition refers to "a thermoplastic elastomer with a chemically cross-linked rubbery phase, produced by dynamic vulcanization". Dynamic vulcanization is "the process of intimate melt mixing of a thermoplastic polymer and a suitable reactive rubbery polymer to generate a thermoplastic elastomer with a chemically cross-linked rubbery phase . . . ". The rubbery phase, whether or not cross-linked, is typically the minor or dispersed phase.

The term "phr" is parts per hundred rubber or "parts", and is a measure common in the art wherein components of a composition are measured relative to a total of all of the elastomer components. The total phr or parts for all rubber components, whether one, two, three, or more different rubber components is present in a given recipe is always defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percents for every component after adjusting levels of only one, or more, component(s).

Isoolefin refers to any olefin monomer having at least one carbon having two substitutions on that carbon.

Multiolefin refers to any monomer having two or more double bonds. In a preferred embodiment, the multiolefin is any monomer comprising two conjugated double bonds such as a conjugated diene like isoprene.

Isobutylene based elastomer or polymer refers to elastomers or polymers comprising at least 70 mol % repeat units from isobutylene.

Hydrocarbon refers to molecules or segments of molecules containing primarily hydrogen and carbon atoms. In some embodiments, hydrocarbon also includes halogenated versions of hydrocarbons and versions containing heteroatoms as discussed in more detail below.

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, a phenyl group ($C_6H_5$).

Substituted refers to at least one hydrogen group being replaced by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, isopropyl, normal butyl, isobutyl, secondary butyl, tertiary butyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptyloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-dibromobutyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

Butyl Rubber

Preferred elastomers useful in the practice of this invention include isobutylene-based homopolymers or copolymers. As stated above, an isobutylene based elastomer or a polymer refers to an elastomer or a polymer comprising at least 70 mol % repeat units from isobutylene. These polymers can be described as random copolymer of a $C_4$ to $C_7$ isomonoolefin derived unit, such as isobutylene derived unit, and at least one other polymerizable unit. The isobutylene-based copolymer may or may not be halogenated.

In one embodiment of the invention, the elastomer is a butyl-type rubber or branched butyl-type rubber, especially halogenated versions of these elastomers. Useful elastomers are unsaturated butyl rubbers such as homopolymers and copolymers of olefins or isoolefins and multiolefins, or homopolymers of multiolefins. These and other types of elastomers suitable for the invention are well known and are described in RUBBER TECHNOLOGY, p 209-581 (Morton ed., Chapman & Hall 1995), THE VANDERBILT RUBBER HANDBOOK, p 105-122 (Ohm ed., R.T. Vanderbilt Co., Inc. 1990), and Kresge and Wang in 8 KIRK-OTHMER ENCYCLOPEDIA OF CHEMICAL TECHNOLOGY, p 934-955 (John Wiley & Sons, Inc. 4th ed. 1993). Non-limiting examples of unsaturated elastomers useful in the method and composition of the present invention are poly(isobutylene-co-isoprene), polyisoprene, polybutadiene, polyisobutylene, poly(styrene-co-butadiene), natural rubber, star-branched butyl rubber, and mixtures thereof. Useful elastomers in the present invention can be made by any suitable means known in the art, and the invention is not herein limited by the method of producing the elastomer.

Elastomeric compositions may comprise at least one butyl rubber. Butyl rubbers are prepared by reacting a mixture of monomers, the mixture having at least (1) a $C_4$ to $C_7$ isoolefin monomer component such as isobutylene with (2) a multiolefin, monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin.

The isoolefin is a $C_4$ to $C_7$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethylfulvene, hexadiene, cyclopentadiene, and piperylene, and other monomers such as disclosed in EP 0 279 456, U.S. Pat. No. 5,506,316 and U.S. Pat. No. 5,162,425. Other polymerizable monomers such as styrene and dichlorostyrene are also suitable for homopolymerization or copolymerization in butyl rubbers. One embodiment of the butyl rubber polymer of the invention is obtained by reacting 95 to 99.5 wt % of isobutylene with 0.5 to 8 wt % isoprene, or from 0.5 wt % to 5.0 wt % isoprene in yet another embodiment. Butyl rubbers and methods of their production are described in detail in, for example, U.S. Pat. No. 2,356,128, U.S. Pat. No. 3,968,076, U.S. Pat. No. 4,474,924, U.S. Pat. No. 4,068,051 and U.S. Pat. No. 5,532,312. See, also, WO 2004/058828, WO 2004/058827, WO 2004/058835, WO 2004/058836, WO 2004/058825, WO 2004/067577, and WO 2004/058829.

A commercial example of a desirable butyl rubber is EXXON™ BUTYL Grades of poly(isobutylene-co-isoprene), having a Mooney viscosity of from 30 to 56 (ML 1+8 at 125° C.) (ExxonMobil Chemical Company, Houston, Tex.). Another commercial example of a desirable butyl-type rubber is VISTANEX™ polyisobutylene rubber having a molecular weight viscosity average of from 0.75 to $2.34 \times 10^6$ (ExxonMobil Chemical Company, Houston, Tex.).

Star Branched Butyl Rubber

Another embodiment of the butyl rubber useful in the invention is a branched or "star-branched" butyl rubber. These rubbers are described in, for example, EP 0 678 529 B1, U.S. Pat. No. 5,182,333 and U.S. Pat. No. 5,071,913. In one embodiment, the star-branched butyl rubber ("SBB") is a composition of a butyl rubber, either halogenated or not, and a polydiene or block copolymer, either halogenated or not. The invention is not limited by the method of forming the SBB. The polydienes/block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the invention is not limited to the type of polydiene used to make the SBB.

In one embodiment, the SBB is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber (EPDM), ethylene-propylene rubber (EPR), styrene-butadiene-styrene and styrene-isoprene-styrene block copolymers. These polydienes are present, based on the monomer wt %, greater than 0.3 wt % in one embodiment, and from 0.3 to 3 wt % in another embodiment, and from 0.4 to 2.7 wt % in yet another embodiment.

A commercial embodiment of the SBB of the present invention is SB Butyl 4266 (ExxonMobil Chemical Company, Houston, Tex.), having a Mooney viscosity (ML 1+8 at 125° C., ASTM D 1646) of from 34 to 44. Further, cure characteristics of SB Butyl 4266 are as follows: MH is 69±6 dN·m, ML is 11.5±4.5 dN·m (ASTM D2084).

Halogenated Butyl Rubber

The elastomer in a desirable embodiment of the invention is halogenated. Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. No. 2,631,984, U.S. Pat. No. 3,099,644, U.S. Pat. No. 4,554,326, U.S. Pat. No. 4,681,921, U.S. Pat. No. 4,650,831, U.S. Pat. No. 4,384,072, U.S. Pat. No. 4,513,116 and U.S. Pat. No. 5,681,901. In one embodiment, the butyl rubber is halogenated in hexane diluent at from 4 to 60° C. using bromine ($Br_2$) or chlorine ($Cl_2$) as the halogenation agent. The halogenated butyl rubber has a Mooney Viscosity of from 20 to 70 (ML 1+8 at 125° C.) in one embodiment, and from 25 to 55 in another embodiment. The halogen wt % is from 0.1 to 10 wt % based in on the weight of the halogenated butyl rubber in one embodiment, and from 0.5 to 5 wt % in another embodiment. In yet another embodiment, the halogen wt % of the halogenated butyl rubber is from 1 to 2.5 wt %.

A commercial embodiment of a suitable halogenated butyl rubber of the present invention is Bromobutyl 2222 (Exxon- Mobil Chemical Company, Houston, Tex.). Its Mooney viscosity is from 27 to 37 (ML 1+8 at 125° C., ASTM 1646, modified), and the bromine content is from 1.8 to 2.2 wt % relative to the Bromobutyl 2222. Further, cure characteristics of Bromobutyl 2222 are as follows: MH is from 28 to 40 dN·m, ML is from 7 to 18 dN·m (ASTM D2084). Another commercial embodiment of the halogenated butyl rubber is Bromobutyl 2255 (ExxonMobil Chemical Company, Houston, Tex.). Its Mooney viscosity is from 41 to 51 (ML 1+8 at 125° C., ASTM D1646), and the bromine content is from 1.8 to 2.2 wt %. Further, cure characteristics of Bromobutyl 2255 are as follows: MH is from 34 to 48 dN·m, ML is from 11 to 21 dN·m (ASTM D2084).

Star Branched Halogenated Butyl Rubber

In another embodiment of elastomer of the invention, a branched or "star-branched" halogenated butyl rubber is used. In one embodiment, the halogenated star-branched butyl rubber is a composition of a butyl rubber, either halogenated or not, and a polydiene or block copolymer, either halogenated or not. The halogenation process is described in detail in U.S. Pat. No. 4,074,035, U.S. Pat. No. 5,071,913, U.S. Pat. No. 5,286,804, U.S. Pat. No. 5,182,333 and U.S. Pat. No. 6,228,978. The invention is not limited by the method of forming the halogenated star branched butyl rubber. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the halogenated star branched butyl rubber. The branching agent or polydiene can be any suitable branching agent, and the invention is not limited to the type of polydiene used to make the halogenated star branched butyl rubber.

In one embodiment, the halogenated star branched butyl rubber is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer wt %, greater than 0.3 wt % in one embodiment, and from 0.3 to 3 wt % in another embodiment, and from 0.4 to 2.7 wt % in yet another embodiment.

A commercial embodiment of the halogenated star branched butyl rubber of the present invention is Bromobutyl 6222 (ExxonMobil Chemical Company, Houston, Tex.), having a Mooney viscosity (ML 1+8 at 125° C., ASTM D1646) of from 27 to 37, and a bromine content of from 2.2 to 2.6 wt % relative to the halogenated star branched butyl rubber. Further, cure characteristics of Bromobutyl 6222 are as follows: MH is from 24 to 38 dN·m, ML is from 6 to 16 dN·m (ASTM D2084).

Halogenated Isobutylene-Para-Methylstyrene Rubber

Elastomeric compositions of the present invention may also comprise at least one random copolymer comprising a $C_4$ to $C_7$ isomonoolefins, such as isobutylene and an alkylstyrene comonomer, such as para-methylstyrene, containing at least 80%, more alternatively at least 90% by weight of the para-isomer and optionally include functionalized interpolymers wherein at least one or more of the alkyl substituents groups present in the styrene monomer units contain benzylic halogen or some other functional group. In another embodiment, the polymer may be a random elastomeric copolymer of ethylene or a $C_3$ to $C_6$ α-olefin and an alkylstyrene comonomer, such as para-methylstyrene containing at least 80%, alternatively at least 90% by weight of the para-isomer and optionally include functionalized interpolymers wherein at least one or more of the alkyl substituents groups present in the styrene monomer units contain benzylic halogen or some other functional group. Exemplary materials may be characterized as polymers containing the following monomer units randomly spaced along the polymer chain:

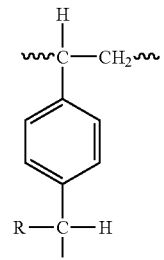

(1)

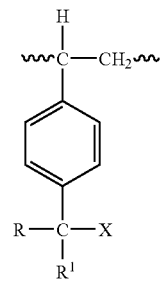

(2)

wherein R and $R^1$ are independently hydrogen, lower alkyl, such as a $C_1$ to $C_7$ alkyl and primary or secondary alkyl halides and X is a functional group such as halogen. In an embodiment, R and $R^1$ are each hydrogen. Up to 60 mol % of the para-substituted styrene present in the random polymer structure may be the functionalized structure (2) above in one embodiment, and in another embodiment from 0.1 to 5 mol %. In yet another embodiment, the amount of functionalized structure (2) is from 0.2 to 3 mol %.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

In an embodiment, the elastomer comprises random polymers of isobutylene and para-methylstyrene containing from 0.5 to 20 mol % para-methylstyrene wherein up to 60 mol % of the methyl substituent groups present on the benzyl ring contain a bromine or chlorine atom, such as a bromine atom (para-(bromomethylstyrene)), as well as acid or ester functionalized versions thereof.

In another embodiment, the functionality is selected such that it can react or form polar bonds with functional groups present in the matrix polymer, for example, acid, amino or hydroxyl functional groups, when the polymer components are mixed at high temperatures.

In certain embodiments, the random copolymers have a substantially homogeneous compositional distribution such that at least 95 wt % of the polymer has a para-alkylstyrene content within 10% of the average para-alkylstyrene content of the polymer. Exemplary polymers are characterized by a narrow molecular weight distribution (Mw/Mn) of less than 5, alternatively less than 2.5, an exemplary viscosity average molecular weight in the range of from 200,000 up to 2,000,000 and an exemplary number average molecular weight in the range of from 25,000 to 750,000 as determined by gel permeation chromatography.

In an embodiment, brominated poly(isobutylene-co-p-methylstyrene) polymers generally contain from 0.1 to 5 mol % of bromomethylstyrene groups relative to the total amount of monomer derived units in the copolymer. In another embodiment, the amount of bromomethyl groups is from 0.2 to 3.0 mol %, and from 0.3 to 2.8 mol % in yet another embodiment, and from 0.4 to 2.5 mol % in yet another embodiment, and from 0.3 to 2.0 mol % in yet another embodiment, wherein a desirable range may be any combination of any upper limit with any lower limit. Expressed another way, exemplary copolymers contain from 0.2 to 10 wt % of bromine, based on the weight of the polymer, from 0.4 to 6 wt % bromine in another embodiment, and from 0.6 to 5.6 wt % in another embodiment, are substantially free of ring halogen or halogen in the polymer backbone chain. In one embodiment, the random polymer is a copolymer of $C_4$ to $C_7$ isoolefin derived units (or isomonoolefin), para-methylstyrene derived units and para-(halomethylstyrene) derived units, wherein the para-(halomethylstyrene) units are present in the polymer from 0.4 to 3.0 mol % based on the total number of para-methylstyrene, and wherein the para-methylstyrene derived units are present from 3 to 15 wt % based on the total weight of the polymer in one embodiment, and from 4 to 10 wt % in another embodiment. In another embodiment, the para-(halomethylstyrene) is para-(bromomethylstyrene).

A commercial embodiment of the halogenated isobutylene-p-methylstyrene rubber of the present invention is EXX-PRO™ elastomers (ExxonMobil Chemical Company, Houston, Tex.), having a Mooney viscosity (ML 1+8 at 125° C., ASTM D1646) of from 30 to 50, a p-methylstyrene content of from 4 to 8.5 wt %, and a bromine content of from 0.7 to 2.2 wt % relative to the halogenated isobutylene-p-methylstyrene rubber.

The elastomer(s) such as discussed above may be prepared by a slurry polymerization, typically in a diluent comprising a halogenated hydrocarbon(s) such as a chlorinated hydrocarbon and/or a fluorinated hydrocarbon including mixtures thereof, (see e.g., WO 2004/058828, WO 2004/058827, WO 2004/058835, WO 2004/058836, WO 2004/058825, WO 2004/067577, and WO 2004/058829).

In certain embodiments directed to blends, the elastomer(s) as described above may be combined with at least one of the following.

General Purpose Rubber

A general purpose rubber, often referred to as a commodity rubber, may be any rubber that usually provides high strength and good abrasion along with low hysteresis and high resilience. These elastomers require antidegradants in the mixed compound because they generally have poor resistance to both heat and oxygen, in particular to ozone. They are often easily recognized in the market because of their low selling prices relative to specialty elastomers and their big volumes of usage as described by *School* in RUBBER TECHNOLOGY COMPOUNDING AND TESTING FOR PERFORMANCE, p 125 (Dick, ed., Hanser, 2001).

Examples of general purpose rubbers include natural rubbers (NR), polyisoprene rubber (IR), poly(styrene-co-butadiene) rubber (SBR), polybutadiene rubber (BR), poly(isoprene-co-butadiene) rubber (IBR), and styrene-isoprene-butadiene rubber (SIBR), and mixtures thereof. Ethylene-propylene rubber (EPM) and ethylene-propylene-diene rubber (EPDM), and their mixtures, often are also referred to as general purpose elastomers.

In another embodiment, the composition may also comprise a natural rubber. Natural rubbers are described in detail by *Subramaniam* in RUBBER TECHNOLOGY, p 179-208 (Morton, ed., Chapman & Hall, 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity as measured at 100° C. (ML 1+4) of from 30 to 120, more preferably from 40 to 65. The Mooney viscosity test referred to herein is in accordance with ASTM D1646.

In another embodiment, the elastomeric composition may also comprise a polybutadiene rubber (BR). The Mooney viscosity of the polybutadiene rubber as measured at 100° C. (ML 1+4) may range from 35 to 70, from 40 to about 65 in another embodiment, and from 45 to 60 in yet another embodiment. Commercial examples of these synthetic rubbers useful in the present invention are sold under the trade name BUDENE™ (Goodyear Chemical Company, Akron, Ohio), BUNA™ (Lanxess Inc., Sarnia, Ontario, Canada), and Diene™ (Firestone Polymers LLC, Akron, Ohio). An example is high cis-polybutadiene (cis-BR). By "cis-polybutadiene" or "high cis-polybutadiene", it is meant that 1,4-cis polybutadiene is used, wherein the amount of cis component is at least 95%. A particular example of high cis-polybutadiene commercial products used in the composition BUDENE™ 1207 or BUNA™ CB 23.

In another embodiment, the elastomeric composition may also comprise a polyisoprene rubber (IR). The Mooney viscosity of the polyisoprene rubber as measured at 100° C. (ML 1+4) may range from 35 to 70, from 40 to about 65 in another embodiment, and from 45 to 60 in yet another embodiment. A commercial example of these synthetic rubbers useful in the present invention is NATSYN™ 2200 (Goodyear Chemical Company, Akron, Ohio).

In another embodiment, the elastomeric composition may also comprise rubbers of ethylene and propylene derived units such as EPM and EPDM as suitable additional rubbers. Examples of suitable comonomers in making EPDM are ethylidene norbornene, 1,4-hexadiene, dicyclopentadiene, as well as others. These rubbers are described in RUBBER TECHNOLOGY, P 260-283 (1995). A suitable ethylene-propylene rubber is commercially available as VISTALON™ (ExxonMobil Chemical Company, Houston, Tex.).

In yet another embodiment, the elastomeric composition may comprise a terpolymer of ethylene/alpha-olefin/diene terpolymer. The alpha-olefin is selected from the group consisting of $C_3$ to $C_{20}$ alpha-olefin with propylene, butene and octene preferred and propylene most preferred. The diene component is selected from the group consisting of $C_4$ to $C_{20}$ dienes. Examples of suitable dienes include straight chain, hydrocarbon diolefin or cylcloalkenyl-substituted alkenes having from 6 to 15 carbon atoms. Specific examples include (a) straight chain acyclic dienes such as 1,4-hexadiene and 1,6-octadiene; (b) branched chain acyclic dienes such as 5-methyl-1,4-hexadiene; 3,7-dimethyl-1,6-octadiene; 3,7-dimethyl-1,7-octadiene; and the mixed isomers of dihydromyricene and dihydroocinene; (c) single ring alicyclic dienes, such as 1,3 cyclopentadiene; 1,4-cyclohexadiene; 1,5-cyclooctadiene and 1,5-cyclododecadiene; (d) multi-ring alicyclic fused and bridged ring dienes such as tetrahydroindene; methyl-tetrahydroindene; dicyclopentadiene (DCPD); bicyclo-(2.2.1)-hepta-2,5-diene; alkenyl, alkylidene, cycloalkenyl and cycloalkylidene norbornene, such as 5-methylene-2-norbornene (MNB), 5-propenyl-2-norbornene, 5-isopropylidene-2-norbornene, 5-ethylidene-2-norbornene (ENB), 5-(4-cyclopentenyl)-2-norbornene, 5-cyclohexylidene-2-norbornene, and 5-vinyl-2-norbornene (VNB); (e) cycloalkenyl-substituted alkenes, such as allyl cyclohexene, vinyl cyclooctene, allyl cyclodecene, vinyl cyclododecene. Examples also include dicyclopentadiene, 1,4-hexadiene, 5-methylene-2-norbornene, and 5-ethylidene-2-norbornene. Examples of diolefins are 5-ethylidene-2-norbornene; 1,4-hexadiene, dicyclopentadiene and 5-vinyl-2-norbornene. For more information and an example how an artisan might apply these terpolymer, see, for example, U.S. Pat. No. 6,245,856.

Specialty Rubber

In one embodiment, the secondary elastomer is a specialty rubber containing a polar functional group such as butadiene-acrylonitrile rubber (NBR, or nitrile rubber), a copolymer of 2-propenenitrile and 1,3-butadiene. Nitrile rubber can have an acrylonitrile content of from 10 to 50 wt % in one embodiment, from 15 to 40 wt % in another embodiment, and from 18 to 35 wt % in yet another embodiment. The Mooney viscosity may range from 30 to 90 in one embodiment (1+4, 100° C., ASTM D1646), and from 30 to 75 in another embodiment. These rubbers are common in the art, and described in, for example, HANDBOOK OF PLASTICS, ELASTOMERS, AND COMPOSITES 1.41-1.49 (Harper, ed., McGraw-Hill, Inc. 1992). Commercial examples of these synthetic rubbers useful in the present invention are sold under the trade names BREON™, NIPOL™, SIVIC™ and ZETPOL™ (Zeon Chemicals, Louisville, Ky.), EUROPRENE™ N (Polimeri Europa Americas, Houston, Tex.), and KRYNAC™, PERBUNAN™ and THERBAN™ (Lanxess Corporation, Akron, Ohio).

In another embodiment, the secondary elastomer is a derivative of NBR such as hydrogenated or carboxylated or styrenated nitrile rubbers. Butadiene-acrylonitrile-styrene rubber (SNBR, or "ABS" rubber), a copolymer of 2-propenenitrile, 1,3-butadiene and styrene, can have an acrylonitrile content of from 10 to 40 wt % in one embodiment, from 15 to 30 wt % in another embodiment, and from 18 to 30 wt % in yet another embodiment. The styrene content of the SNBR copolymer may range from 15 to 40 wt % in one embodiment, and from 18 to 30 wt % in another embodiment, and from 20 to 25 wt % in yet another embodiment. The Mooney viscosity may range from 30 to 60 in one embodiment (1+4, 100° C., ASTM D1646), and from 30 to 55 in another embodiment. These rubbers are common in the art, and described in, for example, HANDBOOK OF PLASTICS, ELASTOMERS, AND COMPOSITES 1.41-1.49 (Harper, ed., McGraw-Hill, Inc. 1992). A commercial example of this synthetic rubber useful in the present invention is sold under the trade name KRYNAC™ (Lanxess Corporation, Akron, Ohio).

In yet another embodiment, the secondary elastomer is a specialty rubber containing a halogen group such as polychloroprene (CR, or chloroprene rubber), a homopolymer of 2-chloro-1,3-butadiene. The Mooney viscosity may range from 30 to 110 in one embodiment (1+4, 100° C., ASTM D1646), and from 35 to 75 in another embodiment. These rubbers are common in the art, and described in, for example, HANDBOOK OF PLASTICS, ELASTOMERS, AND COMPOSITES 1.41-1.49 (Harper, ed., McGraw-Hill, Inc. 1992). Commercial examples of these synthetic rubbers useful in the present invention are sold under the trade names NEOPRENE™ (DuPont Dow Elastomers, Wilmington, Del.), BUTACLOR™ (Polimeri Europa Americas, Houston, Tex.) and BAYPREN™ (Lanxess Corporation, Akron, Ohio).

Semicrystalline Polymer

In an embodiment, the elastomeric compositions may comprise at least one semicrystalline polymer that is an elastic polymer with a moderate level of crystallinity due to stereoregular propylene sequences. The semicrystalline polymer may comprise: (A) a propylene homopolymer in which the stereoregularity is disrupted in some manner such as by regio-inversions; (B) a random propylene copolymer in which the propylene stereoregularity is disrupted at least in part by comonomers or (C) a combination of (A) and (B).

In another embodiment, the semicrystalline polymer further comprises a non-conjugated diene monomer to aid in vulcanization and other chemical modification of the blend composition. The amount of diene present in the polymer is preferably less than 10 wt %, and more preferably less than 5 wt %. The diene may be any non-conjugated diene which is commonly used for the vulcanization of ethylene propylene rubbers including, but not limited to, ethylidene norbornene, vinyl norbornene, and dicyclopentadiene.

In one embodiment, the semicrystalline polymer is a random copolymer of propylene and at least one comonomer selected from ethylene, $C_4$-$C_{12}$ α-olefins, and combinations thereof. In a particular aspect of this embodiment, the copolymer includes ethylene-derived units in an amount ranging from a lower limit of 2 wt %, 5 wt %, 6 wt %, 8 wt %, or 10 wt % to an upper limit of 20 wt %, 25 wt %, or 28 wt %. This embodiment may also include propylene-derived units present in the copolymer in an amount ranging from a lower limit of 72 wt %, 75 wt %, or 80 wt % to an upper limit of 98 wt %, 95 wt %, 94 wt %, 92 wt %, or 90 wt %. These percentages by weight are based on the total weight of the propylene and ethylene-derived units; i.e., based on the sum of weight percent propylene-derived units and weight percent ethylene-derived units being 100%.

The ethylene composition of a polymer can be measured as follows. A thin homogeneous film is pressed at a temperature of about 150° C. or greater, then mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585−111.987X+30.045 $X^2$, wherein X is the ratio of the peak height at 1155 cm$^{-1}$ and peak height at either 722 cm$^{-1}$ or 732 cm$^{-1}$, whichever is higher. The concentrations of other monomers in the polymer can also be measured using this method.

Comonomer content of discrete molecular weight ranges can be measured by Fourier Transform Infrared Spectroscopy (FTIR) in conjunction with samples collected by GPC. One such method is described in Wheeler and Willis, *Applied Spectroscopy, vol* 47, p 1128-1130 (1993). Different but similar methods are equally functional for this purpose and well known to those skilled in the art.

Comonomer content and sequence distribution of the polymers can be measured by $^{13}C$ nuclear magnetic resonance spectroscopy ($^{13}C$ NMR), and such method is well known to those skilled in the art.

In one embodiment, the semicrystalline polymer comprises a random propylene copolymer having a narrow compositional distribution. In another embodiment, the polymer is a random propylene copolymer having a narrow compositional distribution and a melting point as determined by DSC of from 25° C. to 110° C. The copolymer is described as random because for a polymer comprising propylene, comonomer, and optionally diene, the number and distribution of comonomer residues is consistent with the random statistical polymerization of the monomers. In stereoblock structures, the number of block monomer residues of any one kind adjacent to one another is greater than predicted from a statistical distribution in random copolymers with a similar composition. Historical ethylene-propylene copolymers with stereoblock structure have a distribution of ethylene residues consistent with these blocky structures rather than a random statistical distribution of the monomer residues in the polymer. The intramolecular composition distribution (i.e., randomness) of the copolymer may be determined by $^{13}$C NMR, which locates the comonomer residues in relation to the neighboring propylene residues. The intermolecular composition distribution of the copolymer is determined by thermal fractionation in a solvent. A typical solvent is a saturated hydrocarbon such as hexane or heptane. The thermal fractionation procedure is described below. Typically, approximately 75 wt %, preferably 85 wt %, of the copolymer is isolated as one or two adjacent, soluble fractions with the balance of the copolymer in immediately preceding or succeeding fractions. Each of these fractions has a composition (wt % comonomer such as ethylene or other α-olefin) with a difference of no greater than 20% (relative), preferably 10% (relative), of the average weight % comonomer of the copolymer. The copolymer has a narrow compositional distribution if it meets the fractionation test described above. To produce a copolymer having the desired randomness and narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

The crystallinity of the polymers may be expressed in terms of heat of fusion. Embodiments of the present invention include polymers having a heat of fusion, as determined by DSC, ranging from a lower limit of 1.0 J/g, or 3.0 J/g, to an upper limit of 50 J/g, or 10 J/g. Without wishing to be bound by theory, it is believed that the polymers of embodiments of the present invention have generally isotactic crystallizable propylene sequences, and the above heats of fusion are believed to be due to the melting of these crystalline segments.

The crystallinity of the polymer may also be expressed in terms of crystallinity percent. The thermal energy for the highest order of polypropylene is estimated at 189 J/g. That is, 100% crystallinity is equal to 189 J/g. Therefore, according to the aforementioned heats of fusion, the polymer has a polypropylene crystallinity within the range having an upper limit of 65%, 40%, 30%, 25%, or 20%, and a lower limit of 1%, 3%, 5%, 7%, or 8%.

The level of crystallinity is also reflected in the melting point. The term "melting point," as used herein, is the highest peak among principal and secondary melting peaks as determined by DSC, discussed above. In one embodiment of the present invention, the polymer has a single melting point. Typically, a sample of propylene copolymer will show secondary melting peaks adjacent to the principal peak, which are considered together as a single melting point. The highest of these peaks is considered the melting point. The polymer preferably has a melting point by DSC ranging from an upper limit of 110° C., 100° C., 90° C., 80° C., or 70° C., to a lower limit of 0° C., 20° C., 25° C., 30° C., 35° C., 40° C., or 45° C. Typically, a sample of the alpha-olefin copolymer component will show secondary melting peaks adjacent to principal peak; these are considered together as single melting point. The highest of the peaks is considered the melting point.

The semicrystalline polymer may have a weight average molecular weight (Mw) within the range having an upper limit of 5,000,000 g/mol, 1,000,000 g/mol, or 500,000 g/mol, and a lower limit of 10,000 g/mol, 20,000 g/mol, or 80,000 g/mol, and a molecular weight distribution Mw/Mn (MWD), sometimes referred to as a "polydispersity index" (PDI), ranging from a lower limit of 1.5, 1.8, or 2.0 to an upper limit of 40, 20, 10, 5, or 4.5. The Mw and MWD, as used herein, can be determined by a variety of methods, including those in U.S. Pat. No. 4,540,753 and references cited therein, or those methods found in Verstrate et al., *Macromolecules*, vol 21, p 3360 (1988), the descriptions of which are incorporated by reference herein for purposes of United States practices.

In one embodiment, the semicrystalline polymer has a Mooney viscosity, ML(1+4)@ 125° C., of 100 or less, 75 or less, 60 or less, or 30 or less. Mooney viscosity, as used herein, can be measured as ML(1+4)@ 125° C. according to ASTM D1646.

The semicrystalline polymer used in embodiments of the present invention can have a tacticity index (m/r) ranging from a lower limit of 4 or 6 to an upper limit of 8, 10, or 12. The tacticity index, expressed herein as m/r, is determined by $^{13}$C nuclear magnetic resonance ($^{13}$C NMR) is calculated as defined in Cheng, *Macromolecules*, vol 17, p 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50.

In one embodiment, the semicrystalline polymer has isotactic stereoregular propylene crystallinity. The term "stereoregular" as used herein means that the predominant number, i.e. greater than 80%, of the propylene residues in the polypropylene or in the polypropylene continuous phase of a blend, such as impact copolymer exclusive of any other monomer such as ethylene, has the same 1,2 insertion and the stereochemical orientation of the pendant methyl groups is the same, either meso or racemic.

An ancillary procedure for the description of the tacticity of the propylene units of embodiments of the current invention is the use of triad tacticity. The triad tacticity of a polymer is the relative tacticity of a sequence of three adjacent propylene units, a chain consisting of head to tail bonds, expressed as a binary combination of m and r sequences. It is usually expressed for copolymers of the present invention as the ratio of the number of units of the specified tacticity to all of the propylene triads in the copolymer.

The triad tacticity (mm fraction) of a propylene copolymer can be determined from a $^{13}$C NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

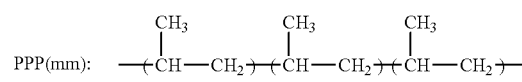

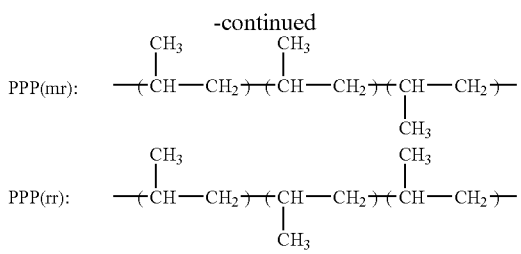

The $^{13}C$ NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in *Polymer*, vol 30, p 1350 (1989). In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm).

The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The semicrystalline polymer may have a triad tacticity of three propylene units, as measured by $^{13}C$ NMR, of 75% or greater, 80% or greater, 82% or greater, 85% or greater, or 90% or greater.

In embodiments of the present invention, the semicrystalline polymer has a melt flow rate (MFR) of 5000 dg/min or less, alternatively, 300 dg/min or less, alternatively 200 dg/min or less, alternatively, 100 dg/min or less, alternatively, 50 dg/min or less, alternatively, 20 dg/min or less, alternatively, 10 dg/min or less, or, alternatively, 2 dg/min or less. The determination of the MFR of the polymer is according to ASTM D1238 (230° C., 2.16 kg).

In certain embodiments, the semicrystalline polymer of the present invention is present in the inventive blend compositions in an amount ranging from a lower limit of 50 wt %, 70 wt %, 75 wt %, 80 wt %, 82 wt %, or 85 wt % based on the total weight of the composition, to an upper limit of 99 wt %, 95 wt %, or 90 wt % based on the total weight of the composition.

In certain embodiments, the semicrystalline polymer used in the present invention is described, for example, in WO 00/69963, WO 00/01766, WO 99/07788, WO 02/083753, and described in further detail as the "Propylene Olefin Copolymer" in WO 00/01745. Semicrystalline polymers are commercially available as VISTAMAXX™ specialty elastomers (ExxonMobil Chemical Company, Houston, Tex.) and VERSIFY™ elastomers (not produced from processes herein described) (Dow Chemical Company, Midland, Mich.).

Thermoplastic Resin

In another embodiment, the elastomeric compositions may comprise at least one thermoplastic resin. Thermoplastic resins suitable for practice of the present invention may be used singly or in combination and are resins containing nitrogen, oxygen, halogen, sulfur or other groups capable of interacting with an aromatic functional groups such as halogen or acidic groups. The resins are present in the nanocomposite from 30 to 90 wt % of the nanocomposite in one embodiment, and from 40 to 80 wt % in another embodiment, and from 50 to 70 wt % in yet another embodiment. In yet another embodiment, the resin is present at a level of greater than 40 wt % of the nanocomposite, and greater than 60 wt % in another embodiment.

Suitable thermoplastic resins include resins selected from the group consisting or polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Additional examples of satisfactory polyamides (especially those having a softening point below 275° C.) are described in 16 ENCYCLOPEDIA OF CHEMICAL TECHNOLOGY, P 1-105 (John Wiley & Sons 1968), CONCISE ENCYCLOPEDIA OF POLYMER SCIENCE AND Technology, p 748-761 (John Wiley & Sons, 1990), and 10 ENCYCLOPEDIA OF POLYMER SCIENCE AND TECHNOLOGY, p 392-414 (John Wiley & Sons 1969). Commercially available thermoplastic polyamides may be advantageously used in the practice of this invention, with linear crystalline polyamides having a softening point or melting point between 160° C. and 260° C. being preferred.

Suitable thermoplastic polyesters which may be employed include the polymer reaction products of one or a mixture of aliphatic or aromatic polycarboxylic acids esters of anhydrides and one or a mixture of diols. Examples of satisfactory polyesters include poly (trans-1,4-cyclohexylene $C_{2-6}$ alkane dicarboxylates such as poly(trans-1,4-cyclohexylene succinate) and poly (trans-1,4-cyclohexylene adipate); poly (cis or trans-1,4-cyclohexanedimethylene) alkanedicarboxylates such as poly(cis-1,4-cyclohexanedimethylene) oxlate and poly-(cis-1,4-cyclohexanedimethylene) succinate, poly ($C_{2-4}$ alkylene terephthalates) such as polyethyleneterephthalate and polytetramethylene-terephthalate, poly ($C_{2-4}$ alkylene isophthalates) such as polyethyleneisophthalate and polytetramethylene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) thermoplastic resins which may be used in accordance with this invention are well known, commercially available materials produced by the oxidative coupling polymerization of alkyl substituted phenols. They are generally linear, amorphous polymers having a glass transition temperature in the range of 190° C. to 235° C. These polymers, their method of preparation and compositions with polystyrene are further described in U.S. Pat. No. 3,383,435.

Other thermoplastic resins which may be used include the polycarbonate analogs of the polyesters described above such as segmented poly (ether co-phthalates); polycaprolactone polymers; styrene resins such as copolymers of styrene with less than 50 mol % of acrylonitrile (SAN) and resinous copolymers of styrene, acrylonitrile and butadiene (ABS); sulfone polymers such as polyphenyl sulfone; copolymers and homopolymers of ethylene and $C_2$ to $C_8$ α-olefins, in one embodiment a homopolymer of propylene derived units, and in another embodiment a random copolymer or block copolymer of ethylene derived units and propylene derived units, and like thermoplastic resins as are known in the art.

In another embodiment the compositions of this invention further comprising any of the thermoplastic resins (also referred to as a thermoplastic or a thermoplastic polymer) described above are formed into dynamically vulcanized alloys.

The term "dynamic vulcanization" is used herein to connote a vulcanization process in which the engineering resin and a vulcanizable elastomer are vulcanized under conditions of high shear. As a result, the vulcanizable elastomer is simultaneously crosslinked and dispersed as fine particles of a "micro gel" within the engineering resin matrix.

Dynamic vulcanization is effected by mixing the ingredients at a temperature which is at or above the curing temperature of the elastomer in equipment such as roll mills, Banbury™, mixers, continuous mixers, kneaders or mixing extruders, e.g., twin screw extruders. The unique characteristic of the dynamically cured compositions is that, notwithstanding the fact that the elastomer component may be fully cured, the compositions can be processed and reprocessed by conventional rubber processing techniques such as extrusion, injection molding, compression molding, etc. Scrap or flashing can be salvaged and reprocessed.

Particularly preferred thermoplastic polymers useful in DVA's of this invention include engineering resins selected from the group consisting of polyamides, polycarbonates, polyesters, polysulfones, polylactones, polyacetals, acrylonitrile-butadiene-styrene resins (ABS), polyphenyleneoxide (PPO), polyphenylene sulfide (PPS), styrene-acrylonitrile resins (SAN), polyimides, styrene maleic anhydride (SMA), aromatic polyketones (PEEK, PEK, and PEKK) and mixtures thereof. Preferred engineering resins are polyamides. The more preferred polyamides are nylon 6 and nylon 11. Preferably the engineering resin(s) may suitably be present in an amount ranging from about 10 to 98 wt %, preferably from about 20 to 95 wt %, the elastomer may be present in an amount ranging from about 2 to 90 wt %, preferably from about 5 to 80 wt %, based on the polymer blend. Preferably the elastomer is present in said composition as particles dispersed in said engineering resin.

In a preferred embodiment the elastomer is selected from poly(isobutylene-co-alkylstyrene), preferably poly(isobutylene-co-p-methylstyrene), halogenated poly(isobutylene-co-alkylstyrene), preferably halogenated poly(isobutylene-co-p-methylstyrene), star branched butyl rubber, halogenated star-branched butyl rubber, butyl rubber, halogenated butyl rubber, and mixtures thereof. In another preferred embodiment the elastomer comprises bromobutyl rubber and or chlorobutyl rubber.

The elastomer may be present in the elastomeric composition in a range from up to 90 phr in one embodiment, from up to 50 phr in another embodiment, from up to 40 phr in another embodiment, and from up to 30 phr in yet another embodiment. In yet another embodiment, the elastomer may be present from at least 2 phr, and from at least 5 phr in another embodiment, and from at least 5 phr in yet another embodiment, and from at least 10 phr in yet another embodiment. A desirable embodiment may include any combination of any upper phr limit and any lower phr limit.

In other embodiments, the elastomer, either individually or as a blend (i.e., reactor blends, physical blends such as by melt mixing) of elastomers may be present in the composition from 5 to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

The elastomeric compositions may also contain at least one other elastomer or two or more elastomers. The elastomer(s) may also be combined with other materials or polymers.

In certain embodiments and where applicable, the elastomers used in the practice of the invention can be linear, substantially linear, blocky or branched.

The elastomeric compositions may also include a variety of other components as discussed in greater detail below and may be optionally cured to form cured elastomeric compositions that ultimately are fabricated into end use articles, as described in greater detail below.

Plastomers

The plastomers that are useful in the present invention can be described as polyolefin copolymers having a density of from 0.85 to 0.915 $g/cm^3$ and a melt index (MI) between 0.10 and 30 dg/min. In one embodiment, the useful plastomer is a copolymer of ethylene derived units and at least one of $C_3$ to $C_{10}$ α-olefin derived units, the copolymer having a density in the range of less than 0.915 $g/cm^3$. The amount of comonomer ($C_3$ to $C_{10}$ α-olefin derived units) present in the plastomer ranges from 2 to 35 wt % in one embodiment, and from 5 to 30 wt % in another embodiment, and from 15 to 25 wt % in yet another embodiment, and from 20 to 30 wt % in yet another embodiment.

The plastomer useful in the invention has a melt index (MI) of between 0.1 and 20 dg/min (ASTM D1238; 190° C., 2.1 kg) in one embodiment, and from 0.2 to 10 dg/min in another embodiment, and from 0.3 to 8 dg/min in yet another embodiment. The average molecular weight of useful plastomers ranges from 10,000 to 800,000 in one embodiment, and from 20,000 to 700,000 in another embodiment. The 1% secant flexural modulus (ASTM D790) of useful plastomers ranges from 10 MPa to 150 MPa in one embodiment, and from 20 MPa to 100 MPa in another embodiment. Further, the plastomer that is useful in compositions of the present invention has a melting temperature (Tm) of from 50° C. to 62° C. (first melt peak) and from 65° C. to 85° C. (second melt peak) in one embodiment, and from 52° C. to 60° C. (first melt peak) and from 70° C. to 80° C. (second melt peak) in another embodiment.

Plastomers useful in the present invention are metallocene catalyzed copolymers of ethylene derived units and higher α-olefin derived units such as propylene, 1-butene, 1-hexene and 1-octene, and which contain enough of one or more of these comonomer units to yield a density between 0.860 and 0.900 g/cm$^3$ in one embodiment. The molecular weight distribution (Mw/Mn) of desirable plastomers ranges from 2 to 5 in one embodiment, and from 2.2 to 4 in another embodiment. Examples of a commercially available plastomers are EXACT™ 4150, a copolymer of ethylene and 1-hexene, the 1-hexene derived units making up from 18 to 22 wt % of the plastomer and having a density of 0.895 g/cm$^3$ and MI of 3.5 dg/min (ExxonMobil Chemical Company, Houston, Tex.); and EXACT™ 8201, a copolymer of ethylene and 1-octene, the 1-octene derived units making up from 26 to 30 wt % of the plastomer, and having a density of 0.882 g/cm$^3$ and MI of 1.0 dg/min (ExxonMobil Chemical Company, Houston, Tex.).

Processing Aids

Functionalized Polymer

The invention provides for a process to produce an elastomeric composition, the process comprising contacting at least one elastomer with a processing aid, wherein the processing aid comprises at least one functionalized polymer having at least one anhydride group.

The at least one functionalized polymer may be prepared by functionalizing at least one polymer with at least one anhydride. For example, a manufacturing process for making the at least one functionalized polymer involves solution functionalization of a polymer with an anhydride via either thermal ENE reaction or in the presence of chlorine.

In certain embodiments, the at least one polymer may be derived from a polymer polymerized from monomers including one or more of olefins, alpha-olefins, disubstituted olefins, isoolefins, conjugated dienes, non-conjugated dienes, styrenics and/or substituted styrenics and vinyl ethers. For example, the monomers may contain 2 to 20 carbon atoms, alternatively 2 to 12, and alternatively 4 to 10 carbon atoms.

In an embodiment, the functionalized polymer comprises $C_2$-$C_{12}$ α-olefin derived units.

In another embodiment, the functionalized polymer comprises $C_4$-$C_{10}$ isoolefin derived units.

In yet another embodiment, the functionalized polymer comprises isobutylene derived units.

The at least one anhydride group may be derived from the group consisting of maleic anhydride, itaconic a anhydride, citraconic anhydride, propenyl succinic anhydride, 2-pentenedioic anhydrides, and mixtures thereof. Illustrative examples may be represented by the general formulas:

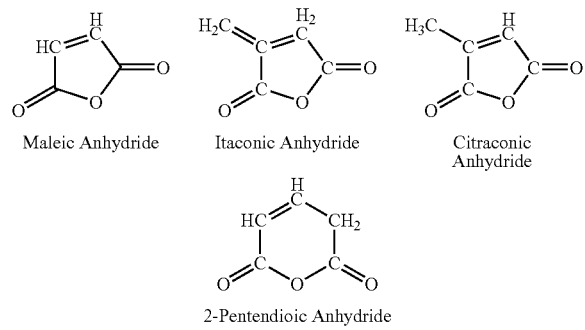

Maleic Anhydride    Itaconic Anhydride    Citraconic Anhydride

2-Pentendioic Anhydride

Such functionalized polymers are widely available and commonly used as lubricant additives. Examples of suppliers of such products include Infineum International Ltd., Linden, N.J., and Chevron Oronite, Company, Houston, Tex.

In an embodiment, the at least one functionalized polymer is succinic anhydride functionalized polyisobutylene (PIBSA). For example, a manufacturing process for making PIBSA may involve solution functionalization of a polyisobutylene or polybutene (PIB) such as a low molecular weight PIB with maleic anhydride via either thermal ENE reaction (thermal PIBSA) or in the presence of chlorine (chloro-PIBSA). As with all the polymers to be functionalized where applicable, the starting PIB can be made from pure isobutylene monomer or a mixture of butene isomers.

In certain embodiments, the number average molecular weight (by gel permeation chromatography) of the starting polymer such as PIB ranges from about 400 (the weight of the molecule in atomic mass units relative to hydrogen atom assigned a value of 1.0) to about 5,000 or higher, alternatively, from about 500 to about 2,500, alternatively, from about 800 to about 2,500, and alternatively, from about 800 to about 1,500.

In certain embodiments, the anhydride functionality of the at least one functionalized polymer such as PIBSA can range from about 0.5 mol % to about 2.0 mol %, alternatively, from about 0.8 mol % to about 1.7 mol %, and alternatively, from about 1.0 mol % to about 1.5 mol %.

Commercial examples include PIBSA 48 functionalized polymer from Infineum referenced above and derived from 2,200 Mn PIB with an anhydride functionality of about 1.2 mol % and PIBSA 55 functionalized polymer derived from 2,200 Mn PIB with an anhydride functionality of about 1.4 mol %. Other commercial examples include OLOA 15500 PIBSA from Chevron Oronite referenced above and derived from 1,000 Mn PIB and OLOA 15667 PIBSA derived from 1,300 Mn PIB.

In yet other embodiments, the processing aid as described above may have a number average molecular weight (Mn) as determined by gel permeation chromatography of less than 10,000 in one embodiment, less than 8000 in another embodiment, and less than 6000 in yet another embodiment. In one embodiment, the processing aid have a number average molecular weight of greater than 400, and greater than 700 in another embodiment, and greater than 900 in yet another embodiment. A preferred embodiment can be a combination of any lower molecular weight limit with any upper molecular weight limit herein. For example, in one embodiment, the processing aid may have a number average molecular weight of from 400 to 10,000, and from 700 to 8000 in another embodiment, and from 900 to 3000 in yet another embodiment.

In certain embodiments, the processing aid may have a number average molecular weight (Mn) of from 450 to 5,000; alternatively, from 500 to 2,500; alternatively, from 900 to 2,500; alternatively, of about 1,000; alternatively, of about 1,300; and alternatively, of about 2,300.

Exemplary viscosities (ASTM D445) of the processing aid may range from about 10 to about 6000 cSt (centiStokes) at 100° C. in one embodiment, alternatively, from about 35 to about 1000 cSt at 100° C., alternatively, from about 75 to about 500 cSt at 100° C., alternatively, from about 100 to about 300 cSt at 100° C., alternatively, from about 100 to about 200 cSt at 100° C., and is greater than 35 cSt at 100° C. in yet another embodiment, and greater than 100 cSt at 100° C. in yet another embodiment.

In yet other embodiments, the viscosities of the processing aid may range from 10 to 6000 cSt (centiStokes) at 100° C. in one embodiment, and from 35 to 5000 cSt at 100° C. in another embodiment. In other embodiments, the viscosity is greater than 35 cSt at 100° C. in yet another embodiment, and greater than 100 cSt at 100° C. in yet another embodiment.

The elastomeric composition comprises or is prepared with from 1 to 60 phr in one embodiment, from 2 to 40 phr in another embodiment, from 3 to 35 phr in another embodiment, from 4 to 30 phr in yet another embodiment, from 2 to 10 phr in yet another embodiment, from 3 to 25 phr in yet another embodiment, and from 2 to 20 phr in yet another embodiment of the processing aid as described above, wherein a desirable range of processing aid may be any upper phr limit combined with any lower phr limit described herein.

In an embodiment, the processing aid or elastomeric composition does not contain aromatic groups or unsaturation.

In another embodiment, the processing aid or elastomeric composition is free or substantially free of or may have only contamination levels of aromatic, napthenic, parafinnic oils, or mixtures thereof. As used here, "substantially free" refers to 1,000 ppm or less, alternatively, 800 ppm or less, alternatively, 500 ppm or less, alternatively, 250 ppm or less, alternatively, 100 ppm or less, alternatively, 75 ppm or less, alternatively, 50 ppm or less, alternatively, 20 ppm or less, alternatively, 15 ppm or less, alternatively, 10 ppm or less, and, alternatively, 5 ppm or less.

In yet other embodiments, the processing aid or elastomeric composition may include other components such as the following.

Polybutenes

In one aspect of the invention, a polybutene processing oil may be present in air barrier compositions. In one embodiment of the invention, the polybutene processing oil is a low molecular weight (less than 15,000 Mn) homopolymer or copolymer of olefin derived units having from 3 to 8 carbon atoms in one embodiment, preferably from 4 to 6 carbon atoms in another embodiment. In yet another embodiment, the polybutene is a homopolymer or copolymer of a $C_4$ raffinate. An embodiment of such low molecular weight polymers termed "polybutene" polymers is described in, for example, SYNTHETIC LUBRICANTS AND HIGH-PERFORMANCE FUNCTIONAL FLUIDS p 357-392 (Rudnick & Shubkin, ed., Marcel Dekker 1999) (hereinafter "polybutene processing oil" or "polybutene").

In one embodiment of the invention, the polybutene processing oil is a copolymer of at least isobutylene derived units, 1-butene derived units, and 2-butene derived units. In one embodiment, the polybutene is a homopolymer, copolymer, or terpolymer of the three units, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In another embodiment, the polybutene is a copolymer or terpolymer of the three units, wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Polybutene processing oils useful in the invention typically have a number average molecular weight (Mn) of less than 10,000 in one embodiment, less than 8000 in another embodiment, and less than 6000 in yet another embodiment. In one embodiment, the polybutene oil has a number average molecular weight of greater than 400, and greater than 700 in another embodiment, and greater than 900 in yet another embodiment. A preferred embodiment can be a combination of any lower molecular weight limit with any upper molecular weight limit herein. For example, in one embodiment of the polybutene of the invention, the polybutene has a number average molecular weight of from 400 to 10,000, and from 700 to 8000 in another embodiment, and from 900 to 3000 in yet another embodiment. Useful viscosities of the polybutene processing oil ranges from 10 to 6000 cSt (centiStokes) at 100° C. in one embodiment, and from 35 to 5000 cSt at 100° C. in another embodiment, and is greater than 35 cSt at 100° C. in yet another embodiment, and greater than 100 cSt at 100° C. in yet another embodiment.

Commercial examples of such a processing oil are the PARAPOL™ Series of processing oils (ExxonMobil Chemical Company, Houston, Tex.), such as PARAPOL™ 450, 700, 950, 1300, 2400 and 2500; ORONITE™ (ChevronTexaco, New Orleans, La.); DAELIM POLYBUTENE™ (Daelim Industrial Co., Ltd., Korea); INDOPOL™ (Innovene USA LLC, Lisle, Ill.); TPC PIB (Texas Petrochemicals, Houston, Tex.). The commercially available PARAPOL™ Series of polybutene processing oils are synthetic liquid polybutenes, each individual formulation having a certain molecular weight, all formulations of which can be used in the composition of the invention. The molecular weights of the PARAPOL™ oils are from 420 Mn (PARAPOL™ 450) to 2700 Mn (PARAPOL™ 2500) as determined by gel permeation chromatography. The MWD of the PARAPOL™ oils range from 1.8 to 3 in one embodiment, and from 2 to 2.8 in another embodiment.

The table below shows some of the properties of the PARAPOL™ oils useful in embodiments of the present invention, wherein the viscosity was determined as per ASTM D445, and the molecular weight by gel permeation chromatography.

| Properties of individual PARAPOL ™ Processing Aids | | |
| --- | --- | --- |
| Grade | Mn | Viscosity @ 100° C., cSt |
| 450 | 420 | 10.6 |
| 700 | 700 | 78 |
| 950 | 950 | 230 |
| 1300 | 1300 | 630 |
| 2400 | 2350 | 3200 |
| 2500 | 2700 | 4400 |

Other properties of PARAPOL™ processing oils are as follows: the density (g/mL) of PARAPOL™ processing oils varies from about 0.85 (PARAPOL™ 450) to 0.91 (PARAPOL™ 2500). The bromine number (CG/G) for PARAPOL™ oils ranges from 40 for the 450 Mn processing oil, to 8 for the 2700 Mn processing oil.

The elastomeric composition of the invention may include one or more types of polybutene as a mixture, blended either prior to addition to the elastomer, or with the elastomer. The amount and identity (e.g., viscosity, Mn, etc.) of the polybutene processing oil mixture can be varied in this manner. Thus, PARAPOL™ 450 can be used when low viscosity is desired in the composition of the invention, while PARAPOL™ 2500 can be used when a higher viscosity is desired, or compositions thereof to achieve some other viscosity or molecular weight. In this manner, the physical properties of the composition can be controlled. More particularly, the phrases "polybutene processing oil", or "polybutene processing oil" include a single oil or a composition of two or more oils used to obtain any viscosity or molecular weight (or other property) desired, as specified in the ranges disclosed herein.

The polybutene processing oil or oils are present in the elastomeric composition of the invention from 1 to 60 phr in one embodiment, and from 2 to 40 phr in another embodiment, from 4 to 35 phr in another embodiment, and from 5 to 30 phr in yet another embodiment, and from 2 to 10 phr in yet another embodiment, and from 5 to 25 phr in yet another embodiment, and from 2 to 20 phr in yet another embodiment, wherein a desirable range of polybutene may be any upper phr limit combined with any lower phr limit described herein. Preferably, the polybutene processing oil does not contain aromatic groups or unsaturation.

The polyolefin compositions of the present invention include a non-functionalized plastizer ("NFP"). The NFP of the present invention is a compound comprising carbon and hydrogen, and does not include to an appreciable extent functional groups selected from hydroxide, aryls and substituted aryls, halogens, alkoxys, carboxylates, esters, carbon unsaturation, acrylates, oxygen, nitrogen, and carboxyl. By "appreciable extent", it is meant that these groups and compounds comprising these groups are not deliberately added to the NFP, and if present at all, are present to less than 5 wt % by weight of the NFP in one embodiment, and less than 1 wt % in another embodiment, and less than 0.5 wt % in yet another embodiment.

In one embodiment, the NFP consists of $C_6$ to $C_{200}$ paraffins, and $C_8$ to $C_{100}$ paraffins in another embodiment. In another embodiment, the NFP consists essentially of $C_6$ to $C_{200}$ paraffins, and consists essentially of $C_8$ to $C_{100}$ paraffins in another embodiment. For purposes of the present invention and description herein, the term "paraffin" includes all isomers such as n-paraffins, branched paraffins, isoparaffins, and may include cyclic aliphatic species, and blends thereof, and may be derived synthetically by means known in the art, or from refined crude oil in such a way as to meet the requirements described for desirable NFPs described herein. It will be realized that the classes of materials described herein that are useful as a NFPs can be utilized alone or admixed with other NFPs described herein in order to obtain the desired properties.

The NFP may be present in the polyolefin compositions of the invention from 0.1 to 60 wt % in one embodiment, and from 0.5 to 40 wt % in another embodiment, and from 1 to 20 wt % in yet another embodiment, and from 2 to 10 wt % in yet another embodiment, wherein a desirable range may comprise any upper wt % limit with any lower wt % limit described herein.

The NFP may also be described by any number of, or any combination of, parameters described herein. In one embodiment, the NFP of the present invention has a pour point of from less than 0° C. in one embodiment, and less than −5° C. in another embodiment, and less than −10° C. in another embodiment, less than −20° C. in yet another embodiment, less than −40° C. in yet another embodiment, less than −50° C. in yet another embodiment, and less than −60° C. in yet another embodiment, and greater than −120° C. in yet another embodiment, and greater than −200° C. in yet another embodiment, wherein a desirable range may include any upper pour point limit with any lower pour point limit described herein. In one embodiment, the NFP is a paraffin or other compound having a pour point of less than −30° C., and between −30° C. and −90° C. in another embodiment, in the viscosity range of from 0.5 to 200 cSt at 40° C. (ASTM D445). Most mineral oils, which typically include aromatic moieties and other functional groups, have a pour point of from 10° C. to −20° C. at the same viscosity range.

The NFP may have a dielectric constant at 20° C. of less than 3.0 in one embodiment, and less than 2.8 in another embodiment, less than 2.5 in another embodiment, and less than 2.3 in yet another embodiment, and less than 2.1 in yet another embodiment. Polyethylene and polypropylene each have a dielectric constant (1 kHz, 23° C.) of at least 2.3 (CRC HANDBOOK OF CHEMISTRY AND PHYSICS (Lide, ed. $82^d$ ed. CRC Press 2001).

The NFP has a viscosity (ASTM D445) of from 0.1 to 3000 cSt at 100° C., and from 0.5 to 1000 cSt at 100° C. in another embodiment, and from 1 to 250 cSt at 100° C. in another embodiment, and from 1 to 200 cSt at 100° C. in yet another embodiment, and from 10 to 500 cSt at 100° C. in yet another embodiment, wherein a desirable range may comprise any upper viscosity limit with any lower viscosity limit described herein.

The NFP has a specific gravity (ASTM D4052, 15.6/15.6° C.) of less than 0.920 g/cm$^3$ in one embodiment, and less than 0.910 g/cm$^3$ in another embodiment, and from 0.650 to 0.900 g/cm$^3$ in another embodiment, and from 0.700 to 0.860 g/cm$^3$, and from 0.750 to 0.855 g/cm$^3$ in another embodiment, and from 0.790 to 0.850 g/cm$^3$ in another embodiment, and from 0.800 to 0.840 g/cm$^3$ in yet another embodiment, wherein a desirable range may comprise any upper specific gravity limit with any lower specific gravity limit described herein. The NFP has a boiling point of from 100° C. to 800° C. in one embodiment, and from 200° C. to 600° C. in another embodiment, and from 250° C. to 500° C. in yet another embodiment. Further, the NFP has a weight average molecular weight (GPC or GC) of less than 20,000 g/mol in one embodiment, and less than 10,000 g/mol in yet another embodiment, and less than 5,000 g/mol in yet another embodiment, and less than 4,000 g/mol in yet another embodiment, and less than 2,000 g/mol in yet another embodiment, and less than 500 g/mol in yet another embodiment, and greater than 100 g/mol in yet another embodiment, wherein a desirable molecular weight range can be any combination of any upper molecular weight limit with any lower molecular weight limit described herein.

A compound suitable as an NFP for polyolefins of the present invention may be selected from commercially available compounds such as so called "isoparaffins", "polyalphaolefins" (PAOs) and "polybutenes" (a subgroup of PAOs). These three classes of compounds can be described as paraffins which can include branched, cyclic, and normal structures, and blends thereof. These NFPs can be described as comprising $C_6$ to $C_{200}$ paraffins in one embodiment, and $C_8$ to $C_{100}$ paraffins in another embodiment.

Isoparaffins

The so called "isoparaffins" are described as follows. These paraffins are desirably isoparaffins, meaning that the paraffin chains possess $C_1$ to $C_{10}$ alkyl branching along at least a portion of each paraffin chain. The $C_6$ to $C_{200}$ paraffins may comprise $C_6$ to $C_{25}$ isoparaffins in one embodiment, and $C_8$ to $C_{20}$ isoparaffins in another embodiment.

More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and preferably wherein the total number of carbon atoms per molecule is in the range between 6 to 50, and between 10 and 24 in another embodiment, and from 10 to 15 in yet another embodiment. Various isomers of each carbon number will typically be present. The isoparaffins may also include cycloparaffins with branched side chains, generally as a minor component of the isoparaffin. The density (ASTM D4052, 15.6/15.6° C.) of these isoparaffins ranges from 0.70 to 0.83 g/cm$^3$; a pour point of below −40° C. in one embodiment, and below −50° C. in another embodiment; a viscosity (ASTM 445, 25° C.) of from 0.5 to 20 cSt at 25° C.; and average molecular weights in the range of 100 to 300 g/mol. The isoparaffins are commercially available under the trade name ISOPAR (ExxonMobil Chemical Company, Houston Tex.), and are described in, for example, U.S. Pat. No. 6,197,285, U.S. Pat. No. 3,818,105 and U.S. Pat. No. 3,439,088, and sold commercially as ISOPAR™ series of isoparaffins.

ISOPAR Series Isoparaffins

| Name | Distillation Range (° C.) | Pour Point (° C.) | Avg. Specific Gravity (g/cm$^3$) | Viscosity @ 25° C. (cSt) | Saturates and Aromatics (wt %) |
|---|---|---|---|---|---|
| ISOPAR E | 117-136 | −63 | 0.72 | 0.85 | <0.01 |
| ISOPAR G | 161-176 | −57 | 0.75 | 1.46 | <0.01 |
| ISOPAR H | 178-188 | −63 | 0.76 | 1.8 | <0.01 |
| ISOPAR K | 179-196 | −60 | 0.76 | 1.85 | <0.01 |
| ISOPAR L | 188-207 | −57 | 0.77 | 1.99 | <0.01 |
| ISOPAR M | 223-254 | −57 | 0.79 | 3.8 | <0.01 |
| ISOPAR V | 272-311 | −63 | 0.82 | 14.8 | <0.01 |

In another embodiment, the isoparaffins are a mixture of branched and normal paraffins having from 6 to 50 carbon atoms, and from 10 to 24 carbon atoms in another embodiment, in the molecule. The isoparaffin composition has an a branch paraffin:n-paraffin ratio ranging from 0.5:1 to 9:1 in one embodiment, and from 1:1 to 4:1 in another embodiment. The isoparaffins of the mixture in this embodiment contain greater than 50 wt % (by total weight of the isoparaffin composition) mono-methyl species, for example, 2-methyl, 3-methyl, 4-methyl, 5-methyl or the like, with minimum formation of branches with substituent groups of carbon number greater than 1, such as, for example, ethyl, propyl, butyl or the like, based on the total weight of isoparaffins in the mixture. In one embodiment, the isoparaffins of the mixture contain greater than 70 wt % of the mono-methyl species, based on the total weight of the isoparaffins in the mixture. The isoparaffinic mixture boils within a range of from 100° C. to 350° C. in one embodiment, and within a range of from 110° C. to 320° C. in another embodiment. In preparing the different grades, the paraffinic mixture is generally fractionated into cuts having narrow boiling ranges, for example, 35° C. boiling ranges. These branch paraffin/n-paraffin blends are described in, for example, U.S. Pat. No. 5,906,727.

Other suitable isoparaffins are also commercial available under the trade names SHELLSOL™ (Royal Dutch/Shell Group of Companies), SOLTROL™ (Chevron Phillips Chemical Co. LP) and SASOL™ (by Sasol Limited, Johannesburg, South Africa). Commercial examples are SHELLSOL™ (boiling point=215-260° C.), SOLTROL 220 (boiling point=233-280° C.), and SASOL LPA-210 and SASOL-47 (boiling point=238-274° C.).

Polyalphaolefins

The paraffins suitable as the NFP of the invention also include so called polyalphaolefins (PAOs), which are described as follows. The PAOs useful in the present invention comprise $C_6$ to $C_{200}$ paraffins, and $C_{10}$ to $C_{100}$ n-paraffins in another embodiment. The PAOs are dimers, trimers, tetramers, pentamers, etc. of $C_4$ to $C_{12}$ α-olefins in one embodiment, and $C_5$ to $C_{12}$ α-olefins in another embodiment. Suitable olefins include 1-butene, 1-pentene, 1-hexene, 1-heptene, 1-octene, 1-nonene, 1-decene, 1-undodecene and 1-dodecene. In one embodiment, the olefin is 1-decene, and the NFP is a mixture of dimers, trimers, tetramers and pentamers (and higher) of 1-decene. The PAOs are described more particularly in, for example, U.S. Pat. No. 5,171,908, and U.S. Pat. No. 5,783,531 and in SYNTHETIC LUBRICANTS AND HIGH-PERFORMANCE FUNCTIONAL FLUIDS, P 1-52 (Rudnick & Shubkin, ed. Marcel Dekker, Inc. 1999).

The PAOs of the present invention possess a weight average molecular weight of from 100 to 20,000 in one embodiment, and from 200 to 10,000 in another embodiment, and from 200 to 7,000 in yet another embodiment, and from 200 to 2,000 in yet another embodiment, and from 200 to 500 in yet another embodiment. Generally, PAOs have viscosities in the range of 0.1 to 150 cSt at 100° C., and from 0.1 to 3000 cSt at 100° C. in another embodiment (ASTM D445). The PAOs useful in the present invention have pour points of less than 0° C. in one embodiment, less than −10° C. in another embodiment, and less than −20° C. in yet another embodiment, and less than −40° C. in yet another embodiment. Desirable PAOs are commercially available as SHF and SuperSyn PAOs (ExxonMobil Chemical Company, Houston, Tex.).

SHF and SuperSyn Series Polyalphaolefins

| PAO | Specific Gravity (g/cm$^3$; 15.6/15.6° C.) | Viscosity @ 100° C., cSt | VI | Pour Point, ° C. |
|---|---|---|---|---|
| SHF-20 | 0.798 | 1.68 | — | −63 |
| SHF-21 | 0.800 | 1.70 | — | −57 |
| SHF-23 | 0.802 | 1.80 | — | −54 |
| SHF-41 | 0.818 | 4.00 | 123 | −57 |
| SHF-61/63 | 0.826 | 5.80 | 133 | −57 |
| SHF-82/83 | 0.833 | 7.90 | 135 | −54 |
| SHF-101 | 0.835 | 10.0 | 136 | −54 |
| SHF-403 | 0.850 | 40.0 | 152 | −39 |
| SHF-1003 | 0.855 | 107 | 179 | −33 |
| SuperSyn 2150 | 0.850 | 150 | 214 | −42 |
| SuperSyn 2300 | 0.852 | 300 | 235 | −30 |
| SuperSyn 21000 | 0.856 | 1,000 | 305 | −18 |
| SuperSyn 23000 | 0.857 | 3,000 | 388 | −9 |

Other processing aids include esters, polyethers, and polyalkylene glycols.

Other processing aids may be present or used in the manufacture of the elastomeric compositions of the invention. Processing aids include, but are not limited to, plasticizers, tackifiers, extenders, chemical conditioners, homogenizing agents and peptizers such as mercaptans, petroleum and vulcanized vegetable oils, mineral oils, paraffinic oils, polybutene aids, naphthenic oils, aromatic oils, waxes, resins, rosins, and the like.

Certain mineral oils, distinguished by their viscosity indices and the amount of saturates and sulfur they contain, have been classified as Hydrocarbon Basestock Group I, II or III by the American Petroleum Institute (API). Group I basestocks are solvent refined mineral oils. They contain the most unsaturates and sulfur and have the lowest viscosity indices.

Groups II and III are the High Viscosity Index and Very High Viscosity Index mineral oils. They are hydroprocessed mineral oils. The Group III oils contain less unsaturates and sulfur than the Group I oils and have higher viscosity indices than the Group II oils do. Rudnick and Shubkin in *Synthetic Lubricants and High-Performance Functional Fluids*, Second edition, Rudnick, Shubkin, eds., Marcel Dekker, Inc. New York, 1999, describe the mineral oils as typically being:

Group I—mineral oils refined using solvent extraction of aromatics, solvent dewaxing, hydrofining to reduce sulfur content to produce mineral oils with sulfur levels greater than 0.03 wt %, saturates levels of 60 to 80% and a viscosity index of about 90;

Group II—mildly hydrocracked mineral oils with conventional solvent extraction of aromatics, solvent dewaxing, and more severe hydrofining to reduce sulfur levels to less than or equal to 0.03 wt % as well as removing double bonds from some of the olefinic and aromatic compounds, saturate levels are greater than 95-98% and VI is about 80-120; and Group III—severely hydrotreated mineral oils with saturates levels of some oils virtually 100%, sulfur contents are less than or equal to 0.03 wt % (preferably between 0.001 and 0.01%) and VI is in excess of 120.

The processing aid is typically present or used in the manufacturing process from 1 to 70 phr in one embodiment, from 3 to 60 phr in another embodiment, and from 5 to 50 phr in yet another embodiment.

In one embodiment of the invention, paraffinic, naphthenic and/or aromatic oils are substantially absent, meaning, they have not been deliberately added to the compositions, or, in the alternative, if present, are only present up to 0.2 wt % of the compositions used to make the air barriers.

Fillers

The elastomeric composition may have one or more filler components such as, for example, calcium carbonate, silica, clay and other silicates which may or may not be exfoliated, mica, talc, titanium dioxide, and carbon black.

The fillers of the present invention may be any size and typically range, for example, from about 0.0001 μm to about 100 μm. As used herein, silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

In one embodiment, the filler is carbon black or modified carbon black, and combinations of any of these. In another embodiment, the filler is a blend of carbon black and silica. The preferred filler for such articles as tire treads and sidewalls is reinforcing grade carbon black present at a level of from 10 to 100 phr of the blend, more preferably from 30 to 80 phr in another embodiment, and from 50 to 80 phr in yet another embodiment. Useful grades of carbon black, as described in RUBBER TECHNOLOGY, p 59-85, range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Carbon blacks suitable for innerliners and other air barriers include N550, N660, N650, N762, N990 and Regal 85.

The layered filler may comprise a layered clay, optionally, treated or pre-treated with a modifying agent such as organic molecules. The elastomeric compositions may incorporate a clay, optionally, treated or pre-treated with a modifying agent, to form a nanocomposite or nanocomposite composition.

Nanocomposites may include at least one elastomer as described above and at least one modified layered filler. The modified layered filler may be produced by the process comprising contacting at least one layered filler such as at least one layered clay with at least one modifying agent.

The modified layered filler may be produced by methods and using equipment well within the skill in the art. For example, see U.S. Pat. No. 4,569,923, U.S. Pat. No. 5,663,111, U.S. Pat. No. 6,036,765, and U.S. Pat. No. 6,787,592. Illustrations of such methods are demonstrated in the Example section. However, by no means is this meant to be an exhaustive listing.

In an embodiment, the layered filler such as a layered clay may comprise at least one silicate.

In certain embodiments, the silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which includes saponite, hectorite, and sauconite. Also encompassed are smectite-clays prepared synthetically, e.g., by hydrothermal processes as disclosed in U.S. Pat. No. 3,252,757, U.S. Pat. No. 3,586,468, U.S. Pat. No. 3,666,407, U.S. Pat. No. 3,671,190, U.S. Pat. No. 3,844,978, U.S. Pat. No. 3,844,979, U.S. Pat. No. 3,852,405, and U.S. Pat. No. 3,855,147.

In yet other embodiments, the at least one silicate may comprise natural or synthetic phyllosilicates, such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite, and the like. Combinations of any of the previous embodiments are also contemplated.

The layered filler such as the layered clays described above may be modified such as intercalated or exfoliated by treatment with at least one modifying agent or swelling agent or exfoliating agent or additive capable of undergoing ion exchange reactions with the cations present at the interlayer surfaces of the layered filler.

Modifying agents are also known as swelling or exfoliating agents. Generally, they are additives capable of undergoing ion exchange reactions with the cations present at the interlayer surfaces of the layered filler. Suitable exfoliating additives include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides.

For example, amine compounds (or the corresponding ammonium ion) are those with the structure $R^2R^3R^4N$, wherein $R^2$, $R^3$, and $R^4$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so-called long chain tertiary amine, wherein at least $R^2$ is a $C_{14}$ to $C_{20}$ alkyl or alkene.

In other embodiments, a class of exfoliating additives include those which can be covalently bonded to the interlayer surfaces. These include polysilanes of the structure —Si($R^5$)$_2R^6$ where $R^5$ is the same or different at each occurrence and is selected from alkyl, alkoxy or oxysilane and $R^6$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. No. 4,472,538, U.S. Pat. No. 4,810,734, and U.S. Pat. No. 4,889,885 as well as WO 92/02582.

In an embodiment, the exfoliating additive or additives are capable of reacting with the halogen sites of the halogenated elastomer to form complexes which help exfoliate the clay. In certain embodiments, the additives include all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

In yet other embodiments, modifying agents include at least one polymer chain comprising a carbon chain length of from $C_{25}$ to $C_{500}$, wherein the polymer chain also comprises an ammonium-functionalized group described by the following group pendant to the polymer chain E:

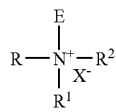

wherein each R, $R^1$ and $R^2$ are the same or different and independently selected from hydrogen, $C_1$ to $C_{26}$ alkyl, alkenes or aryls, substituted $C_1$ to $C_{2-6}$ alkyls, alkenes or aryls, $C_1$ to $C_{26}$ aliphatic alcohols or ethers, $C_1$ to $C_{26}$ carboxylic acids, nitriles, ethoxylated amines, acrylates and esters; and wherein X is a counterion of ammonium such as $Br^-$, $Cl^-$ or $PF_6^-$.

The modifying agent such as described herein is present in the composition in an amount to achieve optimal air retention as measured by the permeability testing described herein. For example, but not limited to, the additive may be employed from 0.1 to 40 phr in one embodiment, and from 0.2 to 20 phr in another embodiment, and from 0.3 to 10 phr in yet another embodiment.

The exfoliating additive may be added to the composition at any stage; for example, the additive may be added to the elastomer, followed by addition of the layered filler, or may be added to a combination of at least one elastomer and at least one layered filler; or the additive may be first blended with the layered filler, followed by addition of the elastomer in yet another embodiment.

Examples of some commercial products are Cloisites produced by Southern Clay Products, Inc. in Gunsalas, Tex. For example, Cloisite Na+, Cloisite 30B, Cloisite 10A, Cloisite 25A, Cloisite 93A, Cloisite 20A, Cloisite 15A, and Cloisite 6A. They are also available as SOMASIF and LUCENTITE clays produced by CO-OP Chemical Co., LTD. In Tokyo, Japan. For example, SOMASIF™ MAE, SOMASIF™ MEE, SOMASIF™ MPE, SOMASIF™ MTE, SOMASIF™ ME-100, LUCENTITE™ SPN, and LUCENTITE(SWN).

The amount of clay or exfoliated clay incorporated in the nanocomposites in accordance with an embodiment of the invention is sufficient to develop an improvement in the mechanical properties or barrier properties of the nanocomposite, for example, tensile strength or oxygen permeability. Amounts generally will range from 0.5 to 10 wt % in one embodiment, and from 1 to 5 wt % in another embodiment, based on the polymer content of the nanocomposite. Expressed in parts per hundred rubber, the clay or exfoliated clay may be present from 1 to 30 phr in one embodiment, and from 5 to 20 phr in another embodiment.

Crosslinking Agents, Curatives, Cure Packages, and Curing Processes

In certain embodiments, the elastomeric compositions and the articles made from those compositions may comprise or be manufactured with the aid of at least one cure package, at least one curative, at least one crosslinking agent, and/or undergo a process to cure the elastomeric composition. As used herein, at least one curative package refers to any material or method capable of imparting cured properties to a rubber as commonly understood in the industry. At least one curative package may include any and at least one of the following.

One or more crosslinking agents are preferably used in the elastomeric compositions of the present invention, especially when silica is the primary filler, or is present in combination with another filler. Crosslinking and curing agents include sulfur, zinc oxide, and fatty acids. More preferably, the coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco) and the like, and mixtures thereof. In one embodiment, bis-(3-triethoxysilypropyl)tetrasulfide (sold commercially as Si69 by Degussa) is employed.

Peroxide cure systems or resin cure systems may also be used.

Heat or radiation-induced crosslinking of polymers may be used.

Generally, polymer blends, for example, those used to produce tires, are crosslinked thereby improve the polymer's mechanical properties. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR* in RUBBER WORLD, p 18-23 (1991)).

Sulfur is the most common chemical vulcanizing agent for diene-containing elastomers. It exists as a rhombic 8-member ring or in amorphous polymeric forms. The sulfur vulcanization system also consists of the accelerator to activate the sulfur, an activator, and a retarder to help control the rate of vulcanization. Accelerators serve to control the onset of and rate of vulcanization, and the number and type of sulfur crosslinks that are formed. These factors play a significant role in determining the performance properties of the vulcanizate.

Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Retarders may be used to delay the initial onset of cure in order to allow sufficient time to process the unvulcanized rubber.

Halogen-containing elastomers such as halogenated star-branched butyl rubber, brominated butyl rubber, chlorinated butyl rubber, star-branched brominated butyl (polyisobutylene/isoprene copolymer) rubber, halogenated poly(isobutylene-co-p-methylstyrene), polychloroprene, and chlorosulfonated polyethylene may be crosslinked by their reaction with metal oxides. The metal oxide is thought to react with halogen groups in the polymer to produce an active intermediate which then reacts further to produce carbon-carbon bonds. Zinc halide is liberated as a by-product and it serves as an autocatalyst for this reaction.

Generally, polymer blends may be crosslinked by adding curative molecules, for example sulfur, metal oxides, organometallic compounds, radical initiators, etc., followed by heating. In particular, the following metal oxides are common curatives that will function in the present invention: ZnO, CaO, MgO, $Al_2O_3$, $CrO_3$, FeO, $Fe_2O_3$, and NiO. These metal oxides can be used alone or in conjunction with the corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof (e.g., DIAK products sold by DuPont). (See also, *Formulation Design and Curing Characteristics of NBR Mixes for Seals*, RUBBER WORLD, p 25-30 (1993)). This method of curing elastomers may be accelerated and is often used for the vulcanization of elastomer blends.

The acceleration of the cure process is accomplished in the present invention by adding to the composition an amount of an accelerant, often an organic compound. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), hexamethylene-1,6-bisthiosulfate disodium salt dihydrate (sold commercially as DURALINK™ HTS by Flexsys), 2-morpholinothio benzothiazole (MBS or MOR), blends of 90% MOR and 10% MBTS (MOR 90), N-tertiary-butyl-2-benzothiazole sulfenamide (TBBS), and N-oxydiethylene thiocarbamyl-N-oxydiethylene sulfonamide (OTOS), zinc 2-ethyl hexanoate (ZEH), and "thioureas".

Other Components

The compositions produced in accordance with the present invention typically contain other components and additives customarily used in rubber mixes, such as effective amounts of other nondiscolored and nondiscoloring processing aids, pigments, antioxidants, and/or antiozonants.

Processing

Blends of elastomers may be reactor blends and/or melt mixes. Mixing of the components may be carried out by combining the polymer components, filler and the clay in the form of an intercalate in any suitable mixing device such as a two-roll open mill, Brabender™ internal mixer, Banbury™ internal mixer with tangential rotors, Krupp internal mixer with intermeshing rotors, or preferably a mixer/extruder, by techniques known in the art. Mixing is performed at temperatures in the range from up to the melting point of the elastomer and/or secondary rubber used in the composition in one embodiment, from 40° C. up to 250° C. in another embodiment, and from 100° C. to 200° C. in yet another embodiment, under conditions of shear sufficient to allow the clay intercalate to exfoliate and become uniformly dispersed within the polymer to form the nanocomposite.

Typically, from 70% to 100% of the elastomer or elastomers is first mixed for 20 to 90 seconds, or until the temperature reaches from 40° C. to 75° C. Then, ¾ of the filler, and the remaining amount of elastomer, if any, are typically added to the mixer, and mixing continues until the temperature reaches from 90° C. to 150° C. Next, the remaining filler is added, as well as the processing aid, and mixing continues until the temperature reaches from 140° C. to 190° C. The masterbatch mixture is then finished by sheeting on an open mill and allowed to cool, for example, to from 60° C. to 100° C. when the curatives are added.

Mixing with the clays is performed by techniques known to those skilled in the art, wherein the clay is added to the polymer at the same time as the carbon black in one embodiment. The processing aid is typically added later in the mixing cycle after the carbon black and clay have achieved adequate dispersion in the elastomeric matrix.

The cured compositions of the invention can include various elastomers and fillers with the processing aid. The compositions of the invention typically include isobutylene-based elastomers such as halogenated poly(isobutylene-co-p-methylstyrene), butyl rubber, or halogenated star-branched butyl rubber (HSBB) either alone, or some combination with one another, with the processing aid being present from 3 to 30 phr in one embodiment.

In one embodiment, the composition is halogenated butyl rubber component from 70 to 97 phr that may include a general purpose rubber from 3 to 30 phr, and processing aid present from 3 to 30 phr, a filler such as a carbon black from 20 to 100 phr, and an exfoliating clay from 0.5 to 20 phr in one embodiment, and from 2 to 15 phr in another embodiment. The cure agents such as phenolic resins, sulfur, stearic acid, and zinc oxide, may be present from 0.1 to 10 phr.

In another embodiment, the composition may be a halogenated butyl rubber component from 75 to 97 phr in one embodiment, and from 80 to 97 phr in another embodiment, and processing aid present from 3 to 30 phr, a filler such as a carbon black from 20 to 100 phr, and an exfoliating clay from 0.5 to 20 phr in one embodiment, and from 2 to 15 phr in another embodiment. The cure agents such as phenolic resins, sulfur, stearic acid, and zinc oxide, may be present from 0.1 to 10 phr.

In yet another embodiment, the composition may be a halogenated butyl rubber component from 85 to 97 phr in one embodiment, and from 90 to 97 phr in another embodiment, and processing aid present from 3 to 30 phr, a filler such as a carbon black from 20 to 100 phr, and an exfoliating clay from 0.5 to 20 phr in one embodiment, and from 2 to 15 phr in another embodiment. The cure agents such as phenolic resins, sulfur, stearic acid, and zinc oxide, may be present from 0.1 to 10 phr.

The isobutylene-based elastomer useful in the invention can be blended with various other rubbers or plastics as disclosed herein, in particular thermoplastic resins such as nylons or polyolefins such as polypropylene or copolymers of polypropylene. These compositions are useful in air barriers such as bladders, envelopes, tire innertubes, tire innerliners, air sleeves (such as in air shocks), diaphragms, as well as other applications where high air or oxygen retention is desirable. In one embodiment, the cured composition when formed into an article has a MOCON oxygen transmission at 60° C. of about 40.0 cc-mm/m$^2$-day-mmHg, alternatively, about 45.0 cc-mm/m$^2$-day-mmHg, alternatively, about 50.0 cc-mm/m$^2$-day-mmHg, or alternatively, about 75.0 cc-mm/m$^2$-day-mmHg in another embodiment.

In one embodiment, an air barrier can be made by the method of combining at least one random copolymer comprising a $C_4$ to $C_7$ isomonoolefin derived unit, at least one filler, and functionalized polymeric processing aid having a number average molecular weight greater than 400, and at least one cure agent; and curing the combined components as described above.

In certain embodiments, the elastomeric compositions may optionally comprise:
 a) at least one filler, for example, calcium carbonate, clay, mica, silica, silicates, talc, titanium dioxide, starch, wood flower, carbon black, or mixtures thereof;
 b) at least one clay, for example, montmorillonite, nontronite, beidellite, volkonskoite, laponite, hectorite, saponite, sauconite, magadite, kenyaite, stevensite, vermiculite, halloysite, aluminate oxides, hydrotalcite, or mixtures thereof, optionally, treated with modifying agents;
 c) at least one processing oil, for example, aromatic oil, naphthenic oil, paraffinic oil, or mixtures thereof;
 d) at least one processing aid, for example, plastomer, polybutene, polyalphaolefin oils, or mixtures thereof;
 e) at least one cure package or curative or wherein the elastomeric composition has undergone at least one process to produce a cured composition;
 f) any combination of a-e.

The elastomeric compositions as described above may be used in the manufacture of air membranes such as innerliners and innertubes used in the production of tires. Methods and equipment used to manufacture the innerliners and tires are well known in the art. (See, e.g., U.S. Pat. No. 6,834,695, U.S. Pat. No. 6,832,637, U.S. Pat. No. 6,830,722, U.S. Pat. No. 6,822,027, U.S. Pat. No. 6,814,116, U.S. Pat. No. 6,805,176, U.S. Pat. No. 6,802,922, U.S. Pat. No. 6,802,351, U.S. Pat. No. 6,799,618, U.S. Pat. No. 6,796,348, U.S. Pat. No. 6,796,347, U.S. Pat. No. 6,617,383, U.S. Pat. No. 6,564,625, and U.S. Pat. No. 6,538,066). The invention is not limited to any particular method of manufacture for articles such as innerliners or tires.

Industrial Applicability

The elastomeric compositions of the invention may be extruded, compression molded, blow molded, injection molded, and laminated into various shaped articles including fibers, films, laminates, layers, industrial parts such as automotive parts, appliance housings, consumer products, packaging, and the like.

In particular, the elastomeric compositions are useful in articles for a variety of tire applications such as truck tires, bus tires, automobile tires, motorcycle tires, off-road tires, aircraft tires, and the like. The elastomeric compositions may either be fabricated into a finished article or a component of a finished article such as an innerliner for a tire. The article may be selected from air barriers, air membranes, films, layers (microlayers and/or multilayers), innerliners, innertubes, sidewalls, treads, bladders, envelopes, and the like.

In another application, the elastomeric compositions may be employed in air cushions, pneumatic springs, air bellows, hoses, accumulator bags, and belts such as conveyor belts or automotive belts.

They are useful in molded rubber parts and find wide applications in automobile suspension bumpers, auto exhaust hangers, and body mounts.

Additionally, the elastomeric compositions may also be used as adhesives, caulks, sealants, and glazing compounds. They are also useful as plasticizers in rubber formulations; as components to compositions that are manufactured into stretch-wrap films; as dispersants for lubricants; and in potting and electrical cable filling materials.

In yet other applications, the elastomer(s) or elastomeric compositions of the invention are also useful in chewing-gum, as well as in medical applications such as pharmaceutical stoppers and closures, coatings for medical devices, and the arts for paint rollers.

All priority documents, patents, publications, and patent applications, test procedures (such as ASTM methods), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

EXAMPLES

Physical Test Methods

Test methods are summarized in Table 1.

Cure properties were measured using a MDR 2000 and 0.5 degree arc or ODR 2000 and 3 degree arc at the indicated temperature. Test specimens were cured at the indicated temperature, typically from 150° C. to 160° C., for a time corresponding to t90+ appropriate mold lag. The values "MH" and "ML" used here and throughout the description refer to "maximum torque" and "minimum torque", respectively. The "MS" value is the Mooney scorch value, the "ML(1+4)" value is the Mooney viscosity value. The error ($2\pi$) in the later measurement is ±0.65 Mooney viscosity units. The values of "t" are cure times in minutes, and "ts" is scorch time" in minutes.

When possible, standard ASTM tests were used to determine the cured compound physical properties (see Table 1). Stress/strain properties (tensile strength, elongation at break, modulus values, energy to break) were measured at room temperature using an Instron 4202 or an Instron Series IX Automated Materials Testing System 6.03.08. Tensile measurements were done at ambient temperature on specimens (dog-bone shaped) width of 0.25 inches (0.62 cm) and a length of 1.0 inches (2.5 cm) length (between two tabs) were used. The thickness of the specimens varied and was measured manually by Mitutoyo Digimatic Indicator connected to the system computer. The specimens were pulled at a crosshead speed of 20 inches/min. (51 cm/min.) and the stress/strain data was recorded. The average stress/strain value of at least three specimens is reported. The error ($2\pi$) in Tensile strength measurements is ±0.47 MPa units. The error ($2\pi$) in measuring 100% Modulus is ±0.11 MPa units; the error ($2\pi$) in measuring Elongation at break is ±13% units. Shore A hardness was measured at room temperature by using a Zwick Duromatic.

Oxygen permeability was measured using a MOCON OxTran Model 2/61 operating under the principle of dynamic measurement of oxygen transport through a thin film as published by Pasternak et al. in 8 JOURNAL OF POLYMER SCIENCE: PART A-2, p 467 (1970). The units of measure are cc-mm/m²-day-mmHg. Generally, the method is as follows: flat film or rubber samples are clamped into diffusion cells which are purged of residual oxygen using an oxygen free carrier gas. The carrier gas is routed to a sensor until a stable zero value is established. Pure oxygen or air is then introduced into the outside of the chamber of the diffusion cells. The oxygen diffusing through the film to the inside chamber is conveyed to a sensor which measures the oxygen diffusion rate.

Permeability was tested by the following method. Thin, vulcanized test specimens from the sample compositions were mounted in diffusion cells and conditioned in an oil bath at 65° C. The time required for air to permeate through a given specimen is recorded to determine its air permeability. Test specimens were circular plates with 12.7-cm diameter and 0.38-mm thickness. The error ($2\pi$) in measuring air permeability is ±0.245 (×$10^8$) units.

In one embodiment, the composition has a MOCON at 60° C. of less than $56.0\times10^{-8}$ cc-mm/m²-day-mmHg.

In another embodiment, the composition has a MOCON at 60° C. of less than $50.0\times10^{-8}$ cc-mm/m²-day-mmHg.

In yet another embodiment, the composition has a MOCON at 60° C. of less than $45.0\times10^{-8}$ cc-mm/m²-day-mmHg.

The composition can be used to make any number of articles. In one embodiment, the article is selected from tire curing bladders, tire curing envelopes, tire innerliners, tire innertubes, and air sleeves. Other useful goods that can be made using compositions of the invention include hoses, seals, molded goods, cable housing, and other articles disclosed in THE VANDERBILT RUBBER HANDBOOK, p 637-772 (Ohm, ed., R.T. Vanderbilt Company, Inc. 1990).

TABLE 1

Test Methods

| Parameter | Units | Test |
|---|---|---|
| Mooney Viscosity (polymer) | ML 1 + 8, 125° C., MU | ASTM D1646 |
| Mooney Viscosity (composition) | ML 1 + 4, 100° C., MU | ASTM D1646 |
| Green Strength (100% Modulus) | PSI | ASTM D412 |
| MOCON (@ 60° C.) | cc-mm/m²-day-mmHg | See text |
| Air Permeability (@ 65° C.) | (cm³-cm/cm²-sec-atm) ×$10^8$ | See text |
| Brittleness | ° C. | ASTM D746 |
| Mooney Scorch Time | T5, 125° C., minutes | ASTM D1646 |
| Oscillating Disk Rheometer (ODR) @ 160° C., ±3°arc | | |
| Moving Die Rheometer (MDR) @ 160° C., ± 0.5°arc | | ASTM D2084 |
| ML | deciNewton.meter | |
| MH | dNewton.m | |
| ts2 | minutes | |
| t50 | minutes | |
| t90 | minutes | |
| Physical Properties, press cured Tc 90 + 2 min @ 160° C. | | |
| Hardness | Shore A | ASTM D2240 |
| Modulus 20%, 100%, 300% | MPa | ASTM D412 die C |
| Tensile Strength | MPa | |
| Elongation at Break | % | |
| Energy to Break | N/mm (J) | |
| Hot Air Aging, 72 hrs. @ 125° C. | | ASTM D573 |
| Hardness | Shore A | |
| Modulus 20%, 100%, 300% | MPa | |
| Tensile Strength | MPa | |
| Elongation at Break | % | |
| Energy to Break | N/mm (J) | |
| DeMattia Flex | mm @ kilocycles | ASTM D813 modified |

TABLE 2

Various Components in the Compositions

| Component | Brief Description | Commercial Source |
|---|---|---|
| Bromobutyl 2222 | Brominated Poly(isobutylene-co-isoprene), Mooney Viscosity (1 + 8, 125° C.) of from 27-37 MU | ExxonMobil Chemical Company (Houston, TX) |
| Bromobutyl-6222 | Brominated butyl rubber with styrene block copolymer | ExxonMobil Chemical Company (Houston, TX) |

TABLE 2-continued

Various Components in the Compositions

| Component | Brief Description | Commercial Source |
|---|---|---|
| EXXPRO ™ 01-5 | 10 wt % PMS, 0.85 mol % BrPMS, Mooney viscosity of 45 ± 5 MU (1 + 8, 125° C.) | ExxonMobil Chemical Company (Houston, TX) |
| N660 | Carbon black | Sid Richardson Carbon Company (Fort Worth, TX) |
| CLOISITE ™ 20A | Dimethylditallowammonium chloride modified montmorillonite clay | Southern Clay Products (Gonzalez, TX) |
| CALSOL ™ 810 | Naphthenic Oil ASTM Type 103 | R. E. Carroll, Inc (Trenton, NJ) |
| VIVATEC 500 | TDAE (Treated Distillated Aromatic Extract) oil | Hansen & Rosenthal Group (Hamburg, Germany) |
| PARAPOL ™ | $C_4$ raffinate | ExxonMobil Chemical Company (Houston, TX) |
| TPC 5130 | Polyisobutylene | Texas Petrochemicals (Houston, TX) |
| PIBSA | Polyisobutylene succinic anhydride | Infineum International Ltd. (Linden, NJ) |
| Rosin Oil MR-1085 A | Tackifier, including unsaturated cyclic carboxylic acids | Sovereign Chemical (Akron, OH) |
| SP-1068 | Alkyl phenol formaldehyde resin | Schenectady Int. (Schenectady, NY) |
| STRUKTOL ™ 40 MS | Composition of aliphatic-aromatic-naphthenic resins | Struktol Co. of America (Stow, OH) |
| KADOX ™ 911 | High Purity French Process Zinc Oxide | Zinc Corp. of America (Monaca, PA) |
| KADOX ™ 930 | High Purity French Process Zinc Oxide | Zinc Corp. of America (Monaca, PA) |
| MBTS | 2-Mercaptobenzothiazole disulfide | R. T. Vanderbilt (Norwalk, CT) or Elastochem (Chardon, OH) |
| MAGLITE-K ™ | Magnesium Oxide | C. P. Hall Co. (Stow, OH) |

Testing of Functionalized Polymer

The functionalized polymer polyisobutylene succinic anhydride (PIBSA, Expt 3) was incorporated into a bromobutyl rubber tire innerliner formulation along with other rubber compounding ingredients (see Table 2) by mixing in a two-step process in a Krupp internal mixer equipped with intermeshing rotors. A 1200-gram batch size was used for each mixing stage. The first stage was mixed at a continuous rotor speed of 60 rpm by adding all of the polymers and mixing for 30 seconds. 75% of the carbon black was then added and the mixture was continued to be mixed another 30 seconds. The non-black fillers (clay, etc.) and the processing aids (processing oil, NFP, functional polybutene of the present invention) were added and the mixture was continued to be mixed for another 30 seconds. The remaining carbon black and the resins (Struktol 40MS, SP-1068) were added and the mixture continued to be mixed until a total of 240 seconds elapsed or a mixer temperature of 300° F. was reached, whichever occurred first. The second stage was mixed (1200-gram batch) in the Krupp internal mixer equipped with intermeshing rotors at a rotor speed of 45 rpm. Maximum cooling was used to regulate the temperature of the internal mixer. The step one masterbatch stock and all cure antidegredants (stearic acid, zinc oxide, sulfur, accelerator) were added and the mixture was continued to be mixed until a total of 150 seconds elapsed or a mixer temperature of 220° F. was reached, whichever occurred first. An open two-roll mill was used to sheet out the stocks after each Krupp mixing step. Compounds with a naphthenic processing oil, Control 1, and the NFP polyisobutylene processing aid, Control 2, were similarly prepared as comparative examples. Formulations are shown in Table 3.

TABLE 3

Bromobutyl Rubber Innerliner Test Formulations.

| Ingredient | Control 1 | Control 2 | Expt 3 |
|---|---|---|---|
| BIIR 2222 | 100 | 100 | 100 |
| NR, SMR 20 | | | |
| Carbon Black, N660 | 60 | 60 | 60 |
| SP-1068 | 4 | 4 | 4 |
| Struktol 40MS | 7 | 7 | 7 |
| Processing Oil, Calsol 810 | 8 | | |
| Polybutene, Parapol 950 | | 8 | |
| Functionalized Polybutene, PIBSA C-9220 | | | 8 |
| Stearic acid | 1 | 1 | 1 |
| Zinc Oxide, Kadox 911 | 1 | 1 | 1 |
| Sulfur | 0.5 | 0.5 | 0.5 |
| MBTS | 1.25 | 1.25 | 1.25 |

Results of cure and cured physical property testing indicate that use of the functionalized polymer PIBSA (Expt 3) maintains the reduced MOCON Air Permeability obtained when using a PIB NFP processing aid (Control 2) in place of the naphthenic processing oil (Control 1) in the tire innerliner formulation. Expt 3 has a higher Mooney scorch value compared to that of the PIB NFP (Control 2) and a higher ts2 cure time value compared to that of the naphthenic processing oil (Control 1) and PIB NFP (Control 2), which can allow for easier processing in downstream tire manufacturing steps. Expt 3 has a lower DeMattia crack growth value compared to that of the naphthenic processing oil (Control 1) or the PIB NFP (Control 2), see Table 4. Other cure and cured physical properties are maintained.

TABLE 4

Properties of Bromobutyl Rubber Innerliner Test Formulations.

| Properties | Control 1 | Control 2 | Expt 3 |
|---|---|---|---|
| MDR @160 C., 0.5 arc | | | |
| mh-ml | 3.61 | 3.03 | 2.97 |
| ts2, minutes | 4.97 | 4.90 | 5.75 |
| t50, minutes | 4.59 | 3.86 | 4.34 |
| t90, minutes | 10.32 | 7.97 | 12.40 |
| Viscosity 1 + 4 (100° C.) | 57.6 | 60.1 | 57.7 |
| Scorch @ 135 C., 5 PT, minutes | 17.43 | 12.97 | 17.49 |
| Hardness, Shore A | 49.70 | 49.30 | 52.70 |
| Aged Hardness, Shore A | 63.90 | 59.90 | 64.30 |
| Stress/Strain | | | |
| 20% Modulus, MPa | 0.47 | 0.48 | 0.51 |
| 100% Modulus, MPa | 1.81 | 1.75 | 1.48 |
| 300% Modulus, MPa | 2.93 | 2.84 | 2.31 |
| Tensile, MPa | 9.57 | 9.63 | 8.23 |
| Elongation, % | 868 | 876 | 847 |
| Energy to break, N/mm | 12.48 | 12.33 | 9.77 |
| Aged Stress/Strain (72 hrs@125 C.) | | | |
| 20% Modulus, MPa | 0.80 | 0.60 | 0.77 |
| 100% Modulus, MPa | 1.99 | 1.51 | 1.63 |
| 300% Modulus, MPa | 5.74 | 4.64 | 4.65 |
| Tensile, MPa | 8.15 | 7.58 | 7.31 |
| Elongation, % | 570 | 650 | 611 |
| Energy to break, N/mm | 8.70 | 9.11 | 8.07 |
| DeMattia Flex | | | |
| Crack Growth @1742 kcycles, mm | 11.8 | 5.8 | 3.1 |
| Aged DeMattia Flex (72 hr @125 C.) | | | |
| Crack Growth @1741 kcycles, mm | 15.8 | 9.1 | 8.8 |
| Adhesion | | | |
| Tear Resistance, N/mm | 13.85 | 12.24 | 10.22 |
| MOCON Air Permeability | 52.64 | 45.13 | 46.88 |
| cc · mm/(m2 · day · mmHg) | | | |

The functionalized polymer polyisobutylene succinic anhydride (PIBSA, Expt 6) was incorporated into a bromobutyl rubber tire innerliner formulation along with other rubber compounding ingredients (see Table 2) by mixing by mixing in a Krupp internal mixer in a two-step process essentially identical to that of Control Compounds 1 and 2, and Experimental Compound 3. Compounds with a naphthenic processing oil, Control 4, and the NFP polyisobutylene processing aid, Control 5, were similarly prepared as comparative examples. Formulations are shown in Table 5.

TABLE 5

Bromobutyl Rubber Innerliner Test Formulations.

| Compound | Control 4 | Control 5 | Expt 6 |
|---|---|---|---|
| BIIR 2222 | 100 | 100 | 100 |
| Carbon Black, N660 | 60 | 60 | 60 |
| Clay, Cloisite 20A | 0 | 5 | 5 |
| Processing Oil, Calsol 810 | 8 | | |
| PIB, TPC 5230 | | 8 | |
| PIBSA 55 | | | 8 |
| SP-1068 | 4 | 4 | 4 |
| Struktol 40MS | 7 | 7 | 7 |
| Stearic acid | 1 | 1 | 1 |
| Zinc Oxide, Kadox 911 | 1 | 1 | 1 |
| Sulfur | 0.5 | 0.5 | 0.5 |
| MBTS | 1.25 | 1.25 | 1.25 |

Results of cure and cured physical property testing indicate that use of the functionalized polymer PIBSA (Expt 6) maintains the reduced MOCON Air Permeability obtained when using a PIB NFP processing aid (Control 5) in place of the naphthenic processing oil (Control 4) in the tire innerliner formulation. Expt 6 has a higher Mooney scorch value compared to that of the naphthenic processing oil (Control 4) and the PIB NFP (Control 5), and a higher ts2 cure time value compared to that of the naphthenic processing oil (Control 4), which can allow for easier processing in downstream tire manufacturing steps. Other cure and cured physical properties are maintained, Table 6.

TABLE 6

Properties of Bromobutyl Rubber Innerliner Test Formulations.

| Property | Control 4 | Control 5 | Expt 6 |
|---|---|---|---|
| MDR @160, 0.5 deg arc | | | |
| ml, dN · m | 1.3 | 1.4 | 1.3 |
| mh, dN · m | 4.7 | 5.3 | 4.3 |
| ts2, min. | 4.5 | 6.7 | 6.9 |
| t50, min. | 4.0 | 6.4 | 5.2 |
| t90, min. | 10.6 | 12.3 | 11.3 |
| Mooney Viscosity, ML (1 + 4)@ 100° C. | 53.1 | 52.8 | 50.1 |
| Mooney Scorch @135 C., t5 | 12.7 | 16.0 | 18.0 |
| Shore A Hardness | 43.3 | 49.1 | 47.9 |
| Stress/Strain | | | |
| 100% Modulus, MPa | 0.90 | 1.18 | 1.04 |
| 300% Modulus, MPa | 2.76 | 3.59 | 2.82 |
| Tensile strength, MPa | 8.6 | 9.6 | 8.9 |
| Elongation at break, % | 851 | 776 | 822 |
| Energy to break, MPa | 11.2 | 11.0 | 10.5 |
| MOCON Air Permeability | | | |
| cc · mm/(m2 · day · mmHg) | 69.0 | 53.3 | 58.5 |
| ARES @60 C., 10 Hz, 2% Strain | | | |
| G', MPa | 2.80 | 3.01 | 2.81 |
| G", MPa | 0.48 | 0.63 | 0.60 |
| G*, MPa | 2.84 | 3.07 | 2.87 |
| Tangent delta | 0.173 | 0.210 | 0.212 |

The functionalized polymer polyisobutylene succinic anhydride (PIBSA, Expt 9) was incorporated into a star-branched bromobutyl rubber tire innerliner formulation along with other rubber compounding ingredients (see Table 2) by mixing in a Krupp internal mixer in a two-step process essentially identical to that of Control Compounds 1 and 2, and Experimental Compound 3. Compounds with a naphthenic processing oil, Control 7, and the NFP polyisobutylene processing aid, Control 8, were similarly prepared as comparative examples. Formulations are shown in Table 7.

TABLE 7

Star-Branched Bromobutyl Rubber Innerliner Test Formulations.

| Compound | Control 7 | Control 8 | Expt 9 |
|---|---|---|---|
| SBB 6222 | 100 | 100 | 100 |
| Carbon Black, N660 | 60 | 60 | 60 |
| Clay, Cloisite 20A | 0 | 5 | 5 |
| Processing Oil, Calsol 810 | 8 | | |
| PIB, TPC 5230 | | 8 | |
| PIBSA 55 | | | 8 |
| SP-1068 | 4 | 4 | 4 |
| Struktol 40MS | 7 | 7 | 7 |
| Stearic acid | 1 | 1 | 1 |
| Zinc Oxide, Kadox 911 | 1 | 1 | 1 |
| Sulfur | 0.5 | 0.5 | 0.5 |
| MBTS | 1.25 | 1.25 | 1.25 |

Results of cure and cured physical property testing indicate that use of PIBSA (Expt 9) maintains the reduced MOCON Air Permeability obtained when using a PIB NFP processing aid (Control 8) in the tire innerliner formulation compared to the naphthenic processing oil (Control 7). Expt 9 has a higher Mooney scorch value compared to that of the naphthenic processing oil (Control 7) and the PIB NFP (Control 8), and a higher ts2 cure time value compared to that of the naphthenic processing oil (Control 7), which can allow for easier processing in downstream tire manufacturing steps. Other cure and cured physical properties are maintained, Table 8.

TABLE 8

Properties of Star-Branched Bromobutyl Rubber Innerliner Test Formulations.

| Property | Control 7 | Control 8 | Expt 9 |
|---|---|---|---|
| MDR @160, 0.5 deg arc | | | |
| ml, dN · m | 1.2 | 1.3 | 1.2 |
| mh, dN · m | 4.2 | 5.2 | 3.8 |
| ts2, min. | 6.2 | 8.1 | 8.9 |
| t50, min. | 4.9 | 7.8 | 6.3 |
| t90, min. | 11.0 | 13.8 | 11.7 |
| Mooney Viscosity, ML (1 + 4)@ 100° C. | 50.6 | 49.9 | 46.9 |
| Mooney Scorch @135 C., t5 | 14.8 | 18.2 | 21.5 |
| Shore A Hardness | 44.5 | 50.7 | 45.5 |
| Stress/Strain | | | |
| 100% Modulus, MPa | 0.93 | 1.33 | 1.04 |
| 300% Modulus, MPa | 2.81 | 4.05 | 2.91 |
| Tensile strength, MPa | 8.2 | 9.4 | 8.2 |
| Elongation at break, % | 824 | 759 | 852 |
| Energy to break, MPa | 10.2 | 11.5 | 10.8 |
| MOCON Air Permeability | | | |
| cc · mm/(m2 · day · mmHg) | 70.0 | 53.5 | 55.5 |
| ARES @60 C., 10 Hz, 2% Strain | | | |
| G', MPa | 2.88 | 3.03 | 2.86 |
| G", MPa | 0.46 | 0.57 | 0.60 |
| G*, MPa | 2.91 | 3.09 | 2.92 |
| Tangent delta | 0.158 | 0.188 | 0.211 |

The functionalized polymer polyisobutylene succinic anhydride (PIBSA, Expt 13) was incorporated into a brominated isobutylene-co-para-methylstyrene rubber tire innerliner formulation along with other rubber compounding ingredients (see Table 2) by mixing in a Krupp internal mixer in a two-step process essentially identical to that of Control Compounds 1 and 2, and Experimental Compound 3. Compounds with a naphthenic processing oil, Controls 10 and 11, and the NFP polyisobutylene processing aid, Control 12, were similarly prepared as comparative examples. Formulations are shown in Table 9.

TABLE 9

Brominated-isobutylene-co-para-methylstyrene Rubber Innerliner Test Formulations.

| Ingredient | Control 10 | Control 11 | Control 12 | Expt 13 |
|---|---|---|---|---|
| Exxpro MDX 89-1 | 100 | 100 | 100 | 100 |
| Carbon Black, N660 | 60 | 55 | 55 | 55 |
| Closite 25A | | 4 | 4 | 4 |
| Carbon Black, N660 | 15 | 15 | 15 | 15 |
| SP-1068 | 4 | 4 | 4 | 4 |
| Struktol 40MS | 7 | 7 | 7 | 7 |
| Stearic acid | 1 | 1 | 1 | 1 |
| Processing Oil, Calsol 810 | 8 | 8 | | |
| PIB, Parapol 1300 | | | 8 | |
| Functionalized PIB, PIBSA C9220 | | | | 8 |
| Zinc Oxide, Kadox 911 | 1 | 1 | 1 | 1 |
| Sulfur | 0.5 | 0.5 | 0.5 | 0.5 |
| MBTS | 1.25 | 1.25 | 1.25 | 1.25 |

Results of cure and cured physical property testing indicate that use of PIBSA (Expt 13) maintains the reduced MOCON Air Permeability obtained when using a PIB NFP processing aid (Control 12) in the tire innerliner formulation compared to the naphthenic processing oil (Controls 10 and 11). Expt 13 higher ts2 cure time value compared to that of the naphthenic processing oil (Controls 10 and 11) and the PIB NFP (Control 12). Expt has a lower Mooney viscosity value compared to the PIB NFP (Control 12), which can allow for easier processing in downstream tire manufacturing steps. Other cure and cured physical properties are maintained, Table 10.

TABLE 10

Properties of Brominated-isobutylene-co-para-methylstyrene Rubber Innerliner Test Formulations.

| Property | Control 10 | Control 11 | Control 12 | Expt 13 |
|---|---|---|---|---|
| Cure, ODR | | | | |
| ml, dN · m | 8.3 | 9.8 | 11.3 | 8.7 |
| mh, dN · m | 32.3 | 41.7 | 35.7 | 33.5 |
| ts2, min. | 4.9 | 4.7 | 5.1 | 11.8 |
| t50, min. | 8.5 | 9.8 | 10.0 | 16.0 |
| t90, min. | 12.9 | 18.1 | 17.8 | 20.6 |
| Mooney Viscosity, ML (1 + 4)@100° C. | 56.0 | 54.9 | 59.3 | 55.6 |
| Mooney Scorch @135 C., T5 | 20.9 | 6.3 | 6.8 | — |
| Hardness, Shore A | 54.7 | 55.3 | 55.3 | 58.3 |
| Hardness, Shore A aged 72 hr@125 C. | 61.7 | 58.5 | 53.9 | 58.7 |
| Stress/Strain | | | | |
| 100% Modulus, MPa | 1.22 | 1.34 | 1.48 | 1.32 |
| 300% Modulus, MPa | 3.52 | 3.96 | 4.20 | 3.18 |
| Tensile strength, MPa | 9.02 | 10.29 | 10.73 | 9.51 |
| Elongation at break, % | 928 | 925 | 902 | 1006 |
| Energy to break, MPa | 13.92 | 15.63 | 15.64 | 15.52 |

TABLE 10-continued

Properties of Brominated-isobutylene-co-para-methylstyrene Rubber Innerliner Test Formulations.

| Property | Control 10 | Control 11 | Control 12 | Expt 13 |
|---|---|---|---|---|
| Stress/Strain, aged 72 hr@125 C. | | | | |
| 100% Modulus, MPa | 2.59 | 2.60 | 1.98 | 2.16 |
| 300% Modulus, MPa | 6.98 | 6.89 | 5.66 | 5.51 |
| Tensile strength, MPa | 10.18 | 10.60 | 10.84 | 10.29 |
| Elongation at break, % | 627 | 668 | 763 | 773 |
| Energy to break, MPa | 11.56 | 13.50 | 14.16 | 14.24 |
| MOCON Air Permeability | | | | |
| cc · mm/(m2 · day · mmHg) | 47.8 | 46.3 | 37.7 | 35.9 |
| Adhesion to NR | | | | |
| Tear Resistance, N/mm | 1.75 | 6.45 | 5.76 | 7.25 |
| Adhesion to SBR | | | | |
| Tear Resistance, N/mm | 0.59 | 1.56 | 1.52 | 0.70 |

The functionalized polymer polyisobutylene succinic anhydride (PIBSA, Expt 16) was incorporated into a brominated isobutylene-co-para-methylstyrene rubber tire innerliner formulation along with other rubber compounding ingredients (see Table 2) by mixing in a Krupp internal mixer in a two-step process essentially identical to that of Control Compounds 1 and 2, and Experimental Compound 3. Compounds with a naphthenic processing oil, Control 14, and the NFP polyisobutylene processing aid, Control 15, were similarly prepared as comparative examples. Formulations are shown in Table 11.

TABLE 11

Brominated-isobutylene-co-para-methylstyrene Rubber Innerliner Test Formulations.

| Compound | Control 14 | Control 15 | Expt 16 |
|---|---|---|---|
| Exxpro MDX 01-5 | 100 | 100 | 100 |
| Carbon Black, N660 | 60 | 60 | 60 |
| Clay, Cloisite 20A | 0 | 5 | 5 |
| Processing Oil, Calsol 810 | 8 | | |
| PIB, TPC 5230 | | 8 | |
| PIBSA 55 | | | 8 |
| SP-1068 | 4 | 4 | 4 |
| Struktol 40MS | 7 | 7 | 7 |
| Stearic acid | 1 | 1 | 1 |
| Zinc Oxide, Kadox 911 | 1 | 1 | 1 |
| Sulfur | 0.5 | 0.5 | 0.5 |
| MBTS | 1.25 | 1.25 | 1.25 |

Results of cure and cured physical property testing indicate that use of PIBSA (Expt 16) maintains the reduced MOCON Air Permeability obtained when using a PIB NFP processing aid (Control 15) in the tire innerliner formulation compared to the naphthenic processing oil (Control 14). Expt 16 higher ts2 cure time value compared to that of the naphthenic processing oil (Control 14) and the PIB NFP (Control 15), which can allow for easier processing in downstream tire manufacturing steps. Other cure and cured physical properties are maintained, Table 12.

TABLE 12

Properties of Brominated-isobutylene-co-para-methylstyrene Rubber Innerliner Test Formulations.

| Property | Control 14 | Control 15 | Expt 16 |
|---|---|---|---|
| MDR @160, 0.5 deg arc | | | |
| ml, dN · m | 1.7 | 2.1 | 1.9 |
| mh, dN · m | 6.4 | 6.5 | 5.9 |
| ts2, min. | 5.0 | 8.8 | 12.7 |
| t50, min. | 5.4 | 9.2 | 12.7 |
| t90, min. | 8.4 | 16.3 | 18.0 |
| Mooney Viscosity, ML (1 + 4)@ 100° C. | 63.6 | 69.4 | 63.0 |
| Mooney Scorch @135 C., t5 | 13.8 | 6.1 | 49.2 |
| Shore A Hardness | 49.5 | 51.5 | 52.7 |
| Stress/Strain | | | |
| 100% Modulus, MPa | 1.51 | 2.62 | 1.97 |
| 300% Modulus, MPa | 4.63 | 7.62 | 5.52 |
| Tensile strength, MPa | 9.7 | 12.0 | 10.4 |
| Elongation at break, % | 817 | 586 | 769 |
| Energy to break, MPa | 13.9 | 12.8 | 14.6 |
| MOCON Air Permeability | | | |
| cc · mm/(m2 · day · mmHg) | 56.2 | 42.0 | 42.7 |
| ARES @60 C., 10 Hz, 2% Strain | | | |
| G', MPa | 2.77 | 2.87 | 3.33 |
| G", MPa | 0.37 | 0.38 | 0.54 |
| G*, MPa | 2.79 | 2.89 | 3.38 |
| Tangent delta | 0.134 | 0.131 | 0.161 |

The functionalized polymer polyisobutylene succinic anhydride (PIBSA, Expt 19) was incorporated into a brominated isobutylene-co-para-methylstyrene rubber tire innerliner formulation along with other rubber compounding ingredients (see Table 2) by mixing in tangential mixers using a classical 2-stage mixing cycle. The first mixing step used a GK 400 mixer (about 450 lb batch size) and lasted 4 minutes. Carbon black, TDAE oil, SP-1068 tackifier resin and stearic acid were automatically weighed to appropriate batch amounts and directly injected into the mixer at the appropriate time and/or temperature. The second stage was mixed in GK 160 internal mixer (about 150 lb batch size). Compounds with a TDAE processing oil (Controls 17 and 18) were similarly prepared as comparative examples for Experimental 19. Formulations are shown in Table 13.

TABLE 13

Brominated-isobutylene-co-para-methylstyrene Rubber Innerliner Test Formulations.

| Compound | Control 17 | Control 18 | Expt 19 |
|---|---|---|---|
| Exxpro MDX 01-5 | 100 | 100 | 100 |
| Carbon Black, N660 | 60 | 60 | 60 |
| Clay, Cloisite 20A | 0 | 5 | 5 |
| Processing Oil, TDAE | 8 | 8 | |
| PIBSA | | | 8 |
| SP-1068 | 4 | 4 | 4 |
| Struktol 40MS | 7 | 7 | 7 |
| Stearic acid | 1 | 1 | 1 |
| Zinc Oxide, Kadox 911 | 1 | 1 | 1 |
| Sulfur | 0.5 | 0.5 | 0.5 |
| MBTS | 1.25 | 1.25 | 1.25 |

Results of cure and cured physical property testing indicate that use of PIBSA (Expt 19) affords reduced MOCON Air Permeability and Aged MOCON Air Permeability values compared to when using a TDAE processing oil (Controls 17 and 18) in the tire innerliner formulation. Expt 19 has a higher ts2 cure time value compared to that of the TDAE processing oil (Controls 17 and 18), which can allow for easier processing in downstream tire manufacturing steps. Expt 19 has a higher Fatigue to failure value compared to that of the TDAE processing oil (Controls 17 and 18). Other cure and cured physical properties are maintained, Table 14.

TABLE 14

Properties of Brominated-isobutylene-co-para-methylstyrene Rubber Innerliner Test Formulations.

| Property | Control 17 | Control 18 | Expt 19 |
|---|---|---|---|
| Mooney Viscosity ML (1 + 4)@ 100° C. | 70.1 | 77.0 | 68.8 |
| Green Strength, peak load (N) | 15.32 | 23.31 | 17.93 |
| Green Strength, Time to T75 (min) | 5.39 | 9.35 | 3.26 |
| Cure, MDR @160° C. | | | |
| ml, dN · m | 1.57 | 1.91 | 1.77 |
| mh, dN · m | 6.77 | 6.62 | 6.15 |
| ts2, min. | 4.53 | 7.29 | 13.28 |
| t50, min. | 5.04 | 8.00 | 13.67 |
| t90, min. | 8.39 | 14.25 | 21.36 |
| Hardness, Shore A | 54 | 56 | 58 |
| Aged Hardness, Shore A (72 hr@125° C.) | 58 | 58 | 61 |
| Stress/Strain | | | |
| 100% Modulus, MPa | 1.93 | 2.06 | 2.30 |
| 2300% Modulus, MPa | 5.87 | 6.46 | 6.39 |
| Tensile strength, MPa | 11.21 | 13.14 | 11.89 |
| Elongation at break, % | 780.7 | 799.0 | 858.7 |
| Energy to break, MPa | 18.2 | 20.7 | 20.4 |
| Aged Stress/Strain (72 hr@125° C.) | | | |
| 100% Modulus, MPa | 2.96 | 3.19 | 3.54 |
| 300% Modulus, MPa | 8.49 | 8.91 | 9.30 |
| Tensile strength, MPa | 11.66 | 13.26 | 12.51 |
| Elongation at break, % | 534.2 | 600.7 | 573.2 |
| Energy to break, MPa | 13.17 | 16.44 | 15.43 |
| Fatigue to Failure (kc to failure) | 357860 | 293901 | 733870 |
| Adhesion to NR Carcass | | | |
| Tear Resistance @100° C. | 4.42 | 1.44 | 0.92 |
| Mocon Air Permeability | | | |
| cc · mm/(m2 · day · mmHg) | 20.5 | 19.0 | 16.9 |
| Aged Mocon Air Permeability | | | |
| cc · mm/(m2 · day · mmHg) | 18.0 | 16.1 | 14.1 |

What is claimed is:

1. A process to produce an elastomeric composition, the process comprising contacting at least one elastomer derived from a $C_4$ to $C_7$ isomonoolefin with a processing aid, wherein the processing aid comprises at least one anhydride functionalized polymer, wherein the functionalized polymer has a molecular weight, Mn, of from 800 to 2500, and a viscosity of 35 to about 1000 cSt at 100° C., wherein the at least one elastomer comprises a halogenated butyl rubber, a star-branched halogenated butyl rubber, or a halogenated random copolymer of isobutylene and methylstyrene.

2. The process of claim 1, wherein the at least one anhydride group is derived from the group consisting of maleic anhydride, itaconic anhydride, citraconic anhydride, propenyl succinic anhydride, 2-pentenedioic anhydrides, and mixtures thereof.

3. The process of claim 1, wherein the at least one anhydride group is derived from maleic anhydride.

4. The process of claim 1, wherein the anhydride functionality of the functionalized polymer is in the range of from about 0.5 mol % to about 2.0 mol %.

5. The process of claim 1, wherein the functionalized polymer comprises $C_2$-$C_{12}$ α-olefin derived units or $C_4$-$C_{10}$ isoolefin derived units.

6. The process of claim 1, wherein the at least one elastomer is halogenated with chlorine or bromine.

7. An elastomeric composition produced by the process of claim 1.

8. The elastomeric composition of claim 7, wherein the elastomeric composition is made with 30 phr or less of the processing aid.

9. The elastomeric composition of claim 7, wherein the elastomeric composition is made with 20 phr or less of the processing aid.

10. The elastomeric composition of claim 7, wherein the elastomeric composition further comprises natural rubber (NR), isoprene rubber (IR), styrene-co-butadiene rubber (SBR), isoprene-co-butadiene rubber (IBR), styrene-isoprene-butadiene rubber (SIBR), ethylene-propylene rubber (EP), ethylene-propylene-diene rubber (EPDM), or mixtures thereof.

11. The elastomeric composition of claim 7, the elastomeric composition optionally comprises:
 a) at least one filler selected from calcium carbonate, clay, mica, silica, silicates, talc, titanium dioxide, starch, wood flour, carbon black, or mixtures thereof;
 b) at least one clay selected from montmorillonite, nontronite, beidellite, volkonskoite, laponite, hectorite, saponite, sauconite, magadite, kenyaite, stevensite, vermiculite, halloysite, aluminate oxides, hydrotalcite, or mixtures thereof, optionally, treated with modifying agents;
 c) at least one processing oil selected from aromatic oil, naphthenic oil, paraffinic oil, or mixtures thereof;
 d) at least one non-functionalized polybutene processing aid;
 e) at least one cure package or wherein the elastomeric composition has undergone at least one process to produce a cured composition; or
 f) any combination of a-e.

12. An article produced from the elastomeric composition of claim 7.

13. The article of claim 12, wherein the article has an oxygen permeability rate of 56.0 cc-mm/$m^2$-day-mmHg or less.

14. The article of claim 12, wherein the article has an Elongation at break value of 650% or higher.

15. The article of claim 12, wherein the article has a Shore A hardness value of 60 or lower.

16. The article of claim 12, wherein the article has an Energy to break value of 10.0 MPa or higher.

17. The article of claim 12, wherein the article has a Mooney scorch t5 value at 135° C. of 12.5 minutes or higher.

18. The article of claim 12, wherein the article is selected from the group consisting of innerliners, bladders, air membranes, innertubes, air barriers, films, layers (microlayers and/or multilayers), treads, and sidewalls.

19. The process of claim 1, wherein the functionalized polymer does not contain any aromatic groups or unsaturation.

* * * * *